United States Patent
Sheik et al.

(10) Patent No.: US 12,490,183 B2
(45) Date of Patent: Dec. 2, 2025

(54) CAPABILITY-BASED CELL PRIORITIZATION FOR CELL SELECTION AND RESELECTION

(71) Applicant: QUALCOMM Incorporated, San Diego, CA (US)

(72) Inventors: Ansah Ahmed Sheik, Hyderabad (IN); Chinmaya Padhy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 17/543,017

(22) Filed: Dec. 6, 2021

(65) Prior Publication Data

US 2023/0180121 A1    Jun. 8, 2023

(51) Int. Cl.
*H04W 48/20* (2009.01)
*H04W 48/16* (2009.01)
*H04W 72/56* (2023.01)
*H04W 76/15* (2018.01)

(52) U.S. Cl.
CPC .......... *H04W 48/20* (2013.01); *H04W 48/16* (2013.01); *H04W 76/15* (2018.02); *H04W 72/56* (2023.01)

(58) Field of Classification Search
CPC ..... H04W 48/20; H04W 48/18; H04W 48/16; H04W 36/08; H04W 36/087; H04W 36/14; H04W 36/142; H04W 36/144; H04W 36/0061; H04W 76/15; H04W 76/16; H04W 72/50; H04W 72/51; H04W 72/54; H04W 72/56; H04W 72/563; H04W 72/566; H04W 72/569; H04W 72/27; H04W 72/29
See application file for complete search history.

(56) References Cited

U.S. PATENT DOCUMENTS

| | | | |
|---|---|---|---|
| 2013/0210428 A1* | 8/2013 | Manna | H04W 52/0245 |
| | | | 455/434 |
| 2019/0349825 A1* | 11/2019 | Tseng | H04W 48/20 |
| 2021/0076270 A1* | 3/2021 | Sreenivasa | H04W 36/0085 |
| 2021/0266801 A1* | 8/2021 | Shah | H04B 17/336 |
| 2022/0191779 A1* | 6/2022 | Bergqvist | H04W 24/10 |

* cited by examiner

*Primary Examiner* — Peter Chen
(74) *Attorney, Agent, or Firm* — Holland & Hart LLP/Qualcomm Incorporated

(57) ABSTRACT

Methods, systems, and devices for wireless communications are described. A user equipment (UE) may identify a group of cells available for cell selection or reselection, where the group of cells includes a first subset of cells that each have at least one capability (e.g., of a set of capabilities) and a second subset of cells. The UE may assign a relatively higher respective priority to each cell within the first subset of cells than each cell within the second subset of cells based on each cell within the first subset of cells having at least one capability. The UE may select a cell from the group of cells based on the respective priority and may attempt to camp on the selected cell. Additionally, the UE may store the assigned respective priorities in a data structure at the UE.

22 Claims, 15 Drawing Sheets

| Cell | Selection Priority |
|---|---|
| Cell A | 2 |
| Cell B | 0 |
| Cell C | 1 |
| Cell D | 4 |
| Cell E | 3 |
| Cell F | 5 |
| Cell G | 6 |

301 { 305-a { Cell A, Cell B, Cell C }, 305-b { Cell D, Cell E }, 305-c { Cell F, Cell G } }

CAPABILITY-BASED CELL PRIORITIZATION FOR CELL SELECTION AND RESELECTION

FIELD OF TECHNOLOGY

The following relates to wireless communications, including capability-based cell prioritization for cell selection and reselection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may perform a cell selection procedure at certain instances in which a particular cell (e.g., a base station or a network access node) is selected for a connection between the UE and the wireless communications system. For example, when the UE powers on from a power-off state, the UE may monitor for signals from a number of available cells and perform the cell selection procedure to select one of the cells and transmit a connection establishment request to the selected cell. Alternatively, while camping on a cell, a UE operating in an idle mode or inactive mode may perform a cell reselection procedure by searching for and selecting a cell; based on completing the cell reselection procedure, the UE may instead camp on the selected cell.

SUMMARY

The described techniques relate to improved methods, systems, devices, and apparatuses that support capability-based cell prioritization for cell selection and reselection. Various aspects of the described techniques enable a UE to select, from available cells, a cell that may support a relatively higher throughput. For instance, a cell with a dual connectivity capability, a carrier aggregation capability, or the like, may inherently be able to support increased throughput, e.g., in comparison to other available cells without such capabilities. A UE may assign a priority to each of the available cells based on a respective capability of each cell, and in some examples, may store the assigned respective priorities in a data structure at the UE. During a cell selection or reselection procedure, the UE may select a cell that is associated with a higher priority over other cells with relatively lower priorities and may attempt to camp on the selected cell.

The UE may assign the respective priorities based on additional criteria, such as a power level, a cell type, a bandwidth capability, or a multiple input/multiple output (MIMO) layer capability, or some combination thereof, among other examples. The UE may determine the criteria for each cell based on performing one or multiple cell measurements or based on receiving control signaling from a network entity. For instance, the UE may receive (e.g., from a base station or other network entity) an indication of respective configurations, priorities, or capabilities for each cell, and may assign respective priorities based on the indication(s). Additionally, the UE may perform cell searching based on the respective priorities such that the UE searches for cells associated with relatively higher priorities more frequently than cells associated with relatively lower priorities.

A method of wireless communication at a UE is described. The method may include identifying a set of cells including a first subset of cells that each have at least one capability of one or more capabilities and a second subset of cells different than the first subset of cells, each cell within the second subset of cells lacking each capability of the one or more capabilities, assigning a respective cell selection priority for each cell within the set of cells, wherein each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities, selecting a cell within the set of cells based on the respective cell selection priority for the cell, and attempting to camp on the selected cell within the set of cells.

An apparatus for wireless communication is described. The apparatus may include memory; a transceiver; and at least one processor of a UE, the at least one processor coupled with the memory and the transceiver, and the at least one processor configured to cause the apparatus to identify a set of cells including a first subset of cells that each have at least one capability of one or more capabilities and a second subset of cells different than the first subset of cells, each cell within the second subset of cells lacking each capability of the one or more capabilities, assign a respective cell selection priority for each cell within the set of cells, wherein each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities, select a cell within the set of cells based on the respective cell selection priority for the cell, and attempt to camp on the selected cell within the set of cells.

Another apparatus for wireless communication is described. The apparatus may include means for identifying a set of cells including a first subset of cells that each have at least one capability of one or more capabilities and a second subset of cells different than the first subset of cells, each cell within the second subset of cells lacking each capability of the one or more capabilities, means for assigning a respective cell selection priority for each cell within the set of cells, wherein each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities, means for selecting a cell within the set of cells based on the respective cell selection priority for the cell, and means for attempting to camp on the selected cell within the set of cells.

A non-transitory computer-readable medium storing code for wireless communication is described. The code may include instructions executable by a processor of a UE to identify a set of cells including a first subset of cells that each have at least one capability of one or more capabilities and a second subset of cells different than the first subset of cells, each cell within the second subset of cells lacking each capability of the one or more capabilities, assign a respective cell selection priority for each cell within the set of cells, wherein each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities, select a cell within the set of cells based on the respective cell selection priority for the cell, and attempt to camp on the selected cell within the set of cells.

In some examples of the method, apparatuses, and non-transitory computer-readable medium described herein, each cell within the first subset of cells and each cell within the second subset of cells may be associated with a first radio access technology (RAT) and the method, apparatuses, and non-transitory computer-readable medium may include further operations, features, means, or instructions for assigning respective cell selection priorities to each cell within a third subset of cells included in the set of cells and different than the first subset of cells and the second subset of cells, where each cell within the third subset of cells may have a lower respective cell selection priority than each cell within the second subset of cells based on each cell within the third subset of cells being associated with a second RAT different than the first RAT.

Some examples of the method, apparatuses, and non-transitory computer-readable medium described herein may further include operations, features, means, or instructions for assigning a higher respective cell selection priority to a current serving cell for the UE than for each cell within the first subset of cells.

Some examples of the method, apparatuses, and non-transitory computer-readable medium described herein may further include operations, features, means, or instructions for receiving control signaling indicating a respective configuration for each cell of the set of cells and determining that each cell within the first subset of cells may have at least one capability of the one or more capabilities, that each cell within the second subset of cells lacks each capability of the one or more capabilities, or any combination thereof, based on the received control signaling indicating the respective configuration for each cell of the set of cells.

Some examples of the method, apparatuses, and non-transitory computer-readable medium described herein may further include operations, features, means, or instructions for assigning respective cell selection priorities to each cell within the first subset of cells based on a respective recency of the UE camping on one or more cells within the first subset of cells.

Some examples of the method, apparatuses, and non-transitory computer-readable medium described herein may further include operations, features, means, or instructions for assigning respective cell selection priorities to each cell within the first subset of cells based on a respective carrier aggregation capability, a respective dual connectivity capability, a respective bandwidth capability, a respective MIMO layer capability, a respective reference signal received power (RSRP), a respective cell type, a respective power level, or any combination thereof.

In some examples of the method, apparatuses, and non-transitory computer-readable medium described herein, the one or more capabilities include a dual connectivity capability, a carrier aggregation capability, or any combination thereof.

Some examples of the method, apparatuses, and non-transitory computer-readable medium described herein may further include operations, features, means, or instructions for performing cell searching based on the respective cell selection priority of each cell within the set of cells, where the cell searching includes searching for each cell within the first subset of cells more frequently than each cell within the second subset of cells and where selecting the cell within the set of cells may be further based on performing the cell searching.

Some examples of the method, apparatuses, and non-transitory computer-readable medium described herein may further include operations, features, means, or instructions for receiving, from a network entity, control signaling indicating the respective cell selection priority for each of one or more cells of the set of cells, the respective cell selection priority for each of the one or more cells based on each of the one or more cells having at least one capability of the one or more capabilities and assigning respective cell selection priorities to each cell within the first subset of cells based on the respective cell selection priority indicated by the control signaling for each of the one or more cells.

In some examples of the method, apparatuses, and non-transitory computer-readable medium described herein, the control signaling includes system information that indicates the respective cell selection priority for each of the one or more cells.

In some examples of the method, apparatuses, and non-transitory computer-readable medium described herein, assigning the respective cell selection priority for each cell within the set of cells may further include operations, features, means, or instructions for storing an indication of the respective cell selection priority for each of the one or more cells within a data structure at the UE.

A method of wireless communication at a base station is described. The method may include identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities, and transmitting, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities.

An apparatus for wireless communication is described. The apparatus may include memory; a transceiver; and at least one processor of a base station, the at least one processor coupled with the memory and the transceiver, and the at least one processor configured to cause the apparatus to identify a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities, and transmit, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities.

Another apparatus for wireless communication at a base station is described. The apparatus may include means for identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities, and means for transmitting, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities.

A non-transitory computer-readable medium storing code for wireless communication is described. The code may include instructions executable by a processor of a base station to identify a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities, and transmit, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and further based on each cell within the second subset of cells lacking each capability of the one or more capabilities.

In some examples of the method, apparatuses, and non-transitory computer-readable medium described herein, transmitting the control signaling indicating respective cell selection priorities for each cell within the set of cells may include operations, features, means, or instructions for transmitting, within the control signaling, an indication of whether each cell within the set of cells may have at least one capability of the one or more capabilities.

In some examples of the method, apparatuses, and non-transitory computer-readable medium described herein, each cell within the first subset of cells and each cell within the second subset of cells may be associated with a first RAT.

In some examples of the method, apparatuses, and non-transitory computer-readable medium described herein, each cell within a third subset of cells included in the set of cells and different than the first subset of cells and the second subset of cells may have a lower respective cell selection priority than each cell within the second subset of cells based on each cell within the third subset of cells being associated with a second RAT different than the first RAT.

In some examples of the method, apparatuses, and non-transitory computer-readable medium described herein, the one or more capabilities include a dual connectivity capability, a carrier aggregation capability, or any combination thereof.

In some examples of the method, apparatuses, and non-transitory computer-readable medium described herein, the control signaling includes system information that indicates the respective cell selection priorities for each cell within the set of cells.

BRIEF DESCRIPTION OF THE DRAWINGS

FIG. 3 illustrates an example of a data structure that supports capability-based cell prioritization for cell selection and reselection in accordance with aspects of the present disclosure.

DETAILED DESCRIPTION

Figure 1:
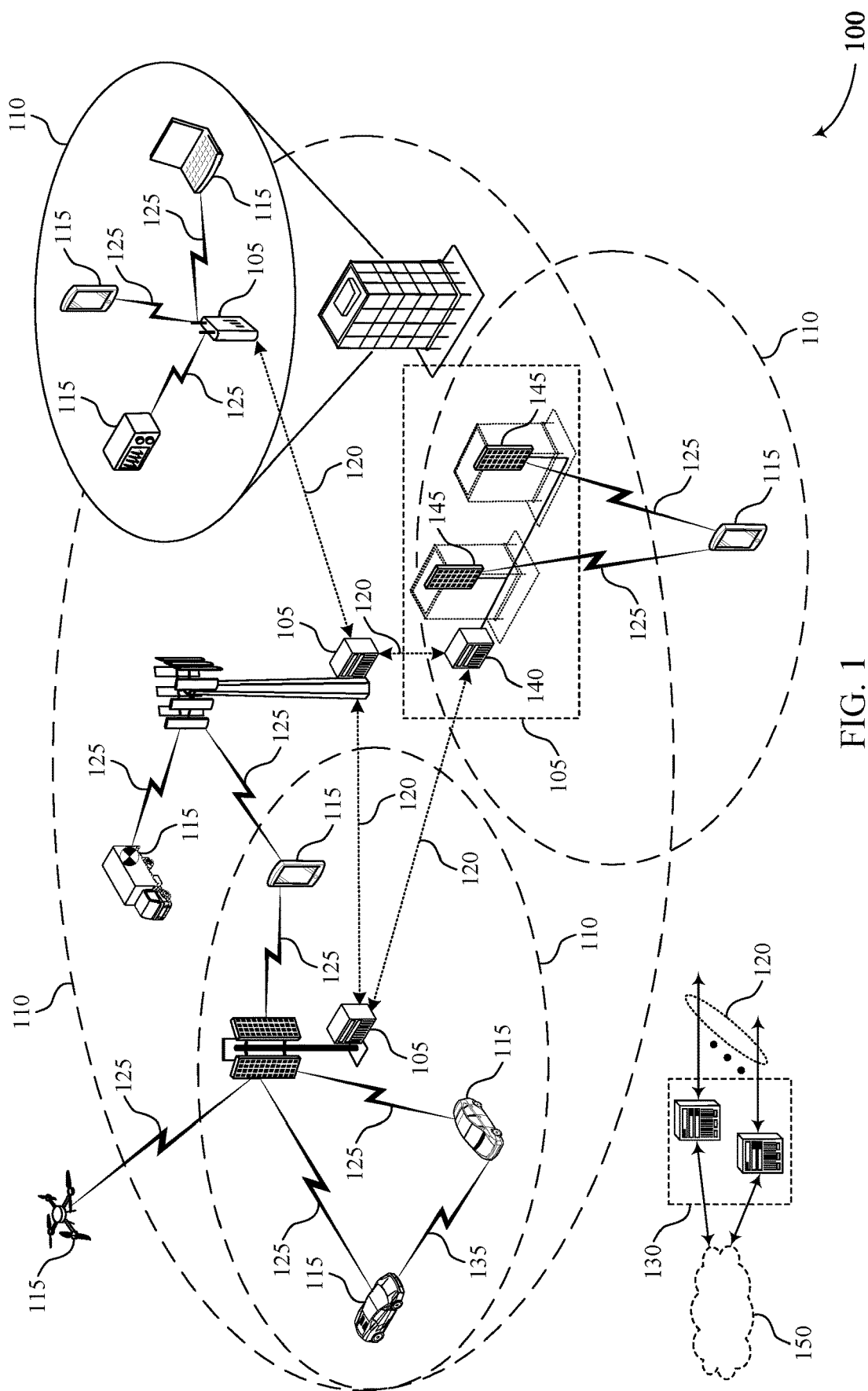
FIGS. 1 and 2 illustrate examples of wireless communications systems that support capability-based cell prioritization for cell selection and reselection in accordance with aspects of the present disclosure.

A UE operating in a wireless communications system may perform a cell selection procedure, where the UE may search for and select a cell (e.g., a base station, a network access node, or other network entity) with which to establish a connection. Additionally, or alternatively, the UE may perform a cell reselection procedure while camping on a cell, where the UE searches for and selects a cell different from the current cell. In both cell selection and reselection procedures, the UE may search for and select a cell based on various cell selection criteria; if a cell meets or exceeds such criteria, the UE may consider the cell to be a suitable cell and may attempt to camp on the cell. For example, the UE may select a cell based on a signal measurement, such as a signal strength (e.g., a reference signal received power (RSRP)), associated with the cell.

The UE may perform various types of scans (e.g., full frequency scans, list frequency scans) while searching for a suitable cell, where the UE may scan one or more frequencies within one or more frequency bands for synchronization signal blocks (SSB) transmitted by candidate (i.e., available) cells. The UE may measure an RSRP of a discovered SSB; if the RSRP satisfies a threshold (e.g., as determined by the cell selection criteria), the UE may select the corresponding cell. Additionally, in some cases, the UE may be configured to create a data structure, such as an acquisition database (ACQ-DB), which may include a listing of cells for each of the one or more frequency groups the UE has successfully camped on previously. The UE may search the ACQ-DB of a frequency group to detect a cell for camping, for example, based on an associated priority of the cell. For instance, the UE may be configured to prioritize scanning cells in order of recency, where the most recent cell on which the UE had previously camped is associated with a highest priority, and so forth. The UE may scan the cells included in the ACQ-DB based on the associated priorities and may select the first cell having an associated RSRP value that satisfies the threshold.

However, in some cases, such parameters may not be adequately representative of the cell's performance. For instance, a cell associated with a high RSRP may still suffer from significant interference or noise. Additionally, or alternatively, other parameters of a cell may provide improved performance in areas other than signal strength, which may be more important to the UE. As an example, a first cell with a relatively lower RSRP may be capable of supporting a relatively higher number of carriers, thereby increasing allowable throughput at the UE. Further, while a cell on which the UE previously camped may have a relatively higher likelihood of providing a successful connection, other candidate cells may provide a stronger signal strength or a higher throughput. A UE performing a cell selection or reselection procedure based on an RSRP value and an order of recency may therefore not be capable of selecting the most appropriate cell at a given time or for a given performance need.

The techniques described herein enable a UE to prioritize respective cells for selection based on criteria including one or more capabilities of each cell. For example, a group of cells available for selection by a UE may include a first subset of cells and a second subset of cells different from the first subset of cells. The UE may assign respective priorities (e.g., cell selection priorities) to each cell within the group of cells based on one or more capabilities of each cell. For instance, each cell in the first subset of cells may have at least one capability of one or more capabilities, such as a dual connectivity capability, a carrier aggregation capability, or the like; accordingly, the UE may assign, to each cell within the first subset of cells, a higher respective priority than each cell within the second subset of cells based on each cell within the first subset of cells having at least one capability. In some cases, the UE may store the respective priorities within a data structure at the UE. In some examples, the UE may maintain the data structure over time, e.g., by updating the assigned priorities. The UE may select a cell from the group of available cells based on the respective priority (e.g., within the data structure) and may attempt to camp on the selected cell.

Aspects of the disclosure are initially described in the context of wireless communications systems. Aspects of the disclosure are then described with reference to a data structure and a process flow. Aspects of the disclosure are further illustrated by and described with reference to apparatus diagrams, system diagrams, and flowcharts that relate to capability-based cell prioritization for cell selection and reselection.

FIG. 1 illustrates an example of a wireless communications system 100 that supports capability-based cell prioritization for cell selection and reselection in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 (also referred to as a cell) over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A cell in the wireless communications system 100 may be configured to support various capabilities and/or technologies. For instance, a cell may be associated with a public land mobile network (PLMN) and may support a given radio access technology (RAT), such as LTE (e.g., including Universal Mobile Telecommunications System (UMTS) Terrestrial Radio Access (UTRA), E-UTRA, etc.), NR, or the like. Additionally, some cells may have a dual connectivity capability and may support multiple RATs simultaneously. For instance, an E-UTRA-NR Dual Connectivity (ENDC), an NR-E-UTRA Dual Connectivity (NEDC) cell, or an NR Dual Connectivity (NRDC) cell may utilize both mmW frequencies and sub-6 GHz frequencies. In an NEDC cell, an NR base station may be a master node and an LTE base station may be a secondary node. In an ENDC cell, on the other hand, an E-UTRA (e.g., LTE) base station may be a master node, while an NR base station may be a secondary node. An NR cell that supports carrier aggregation (e.g., an NR Carrier Aggregation (NRCA) cell) may be capable of concatenating multiple component carriers.

A UE 115 operating in the wireless communications system 100 may perform a cell selection or cell reselection procedure, where the UE 115 searches for and selects a suitable cell (e.g., based on one or more cell selection criteria) on which to camp. For instance, a UE 115 may perform a cell selection procedure to find a cell on which to camp after powering on from a power-off state, or after transitioning from a connected mode (e.g., an RRC connected mode) to an RRC idle or RRC inactive mode. The UE 115 may perform a cell reselection procedure while camped on a cell, where the UE 115 searches among candidate (i.e., available) cells other than the current cell and may reselect to another cell, e.g., if the other cell better meets or exceeds the cell selection criteria.

A UE 115 that is camped on a cell may be a UE 115 that has completed the cell selection and/or reselection process and selected a cell. The selected cell on which the UE 115 is camped may also be referred to as a serving cell. In some examples, a UE 115 camping on a cell may be operating in an RRC idle mode or an RRC inactive mode. While camping on the cell, the UE 115 may monitor the cell's control channel and may receive system information, paging information, or other messages (e.g., public warning system messages, such as Commercial Mobile Alert System (CMAS) notifications or Earthquake and Tsunami Warning System (ETWS) notifications) via the control channel. In some examples, the UE 115 may register its presence in a tracking area of the cell, for instance, via a NAS registration procedure (e.g., a location registration procedure) or an attach procedure. Upon successful registration, the PLMN associated with the cell may become a registered PLMN for the UE 115. In such cases, a network entity of the wireless communications system 100 may be aware of the location of the UE 115 based on the registration, and may transmit a paging message for the UE 115 on the control channel of the selected cell.

In some cases, after camping on the cell, the UE 115 may transition to an RRC connected mode by establishing a connection with the selected cell via the control channel. If instead the UE 115 remains camped on the cell operating in RRC idle or RRC inactive, the UE 115 may continue to search from among available cells; if the UE 115 finds a relatively better cell based on the cell selection criteria, the UE 115 may perform a cell reselection procedure to select and attempt to camp on the better cell.

Searching for a cell during a cell selection or reselection procedure may be based on stored information related to carrier frequencies and/or cell parameters, for instance, from cell measurements previously performed by the UE 115 or system information previously received by the UE 115. For example, the UE 115 may have previously camped on one or more cells and may store information associated with the cells, such as in a database such as an ACQ-DB. The ACQ-DB may include a listing of cells on which the UE 115 has successfully camped for each of the one or more frequency groups. During the cell search, the UE 115 may perform a frequency scan of one or more frequency bands to find SSBs transmitted by candidate cells. In some examples, the UE 115 may be configured to scan frequencies and/or frequency bands in an order.

The UE 115 may be configured to scan all frequency bands in an ascending order (e.g., sub-6 GHz/FR1 bands first, followed by mmW frequency bands/frequencies, etc.). Alternatively, the UE 115 may be configured to scan frequencies associated with cells on which the UE 115 has previously camped in order of the most recent successful camp. Put another way, the UE 115 may prioritize cells that the UE 115 has most recently visited, e.g., according to information stored in the ACQ-DB. In some examples, the UE 115 may only scan frequencies that are stored in the ACQ-DB. However, if the UE 115 fails to find a suitable cell from among those stored in the ACQ-DB, the UE 115 may perform a full frequency band scan and may search all supported frequency bands.

A suitable cell may be a candidate cell that fulfills some cell selection criteria. In some cases, such criteria may be the same for a cell selection procedure and a cell reselection procedure; in other cases, criteria may be different for cell selection than for cell reselection. In a cell search, the UE 115 may select the first suitable scanned cell for camping, e.g., based on the cell selection criteria. For instance, the UE 115 may receive an SSB from a candidate cell during the frequency scan and may measure an RSRP of the SSB. If the RSRP satisfies a threshold as defined by the cell selection criteria, the UE 115 may select that cell for camping and may stop the frequency scan (i.e., stop the cell search). In some cases, after selecting and successfully camping on the cell, the UE 115 may continue to search for a relatively better cell according to the cell selection criteria. A "better" cell may be a cell that has a stronger signal strength (e.g., higher RSRP) value or otherwise surpasses the cell selection criteria compared to the current cell. For example, a UE 115 may determine a signal strength level (also referred to as "Srxlev") (in decibels (dB)) or a signal quality level (also referred to as "Squal").

However, in some cases, this may result in failure of the UE 115 to select a best available cell from the candidate cells. As an example, the UE 115 may first scan a cell on which the UE 115 most recently camped. This cell may have an RSRP that satisfies the threshold and the UE 115 may select the cell. However, a cell associated with a less recent successful camp may have a significantly higher RSRP and therefore may provide an overall stronger signal quality. The UE 115 may be unaware of this higher RSRP as a result of selecting the first scanned suitable cell. Additionally, selecting a cell based on given parameter, such as an RSRP value, may not provide a thorough representation of the cell's performance. For instance, while a high RSRP may provide signal strength and increased reliability, some scenarios may instead rely on other performance metrics such as throughput or efficiency. Further, a cell with a high RSRP may still suffer interference and noise, and the quality of communications in the cell may be poor despite the high RSRP.

Accordingly, the techniques described herein enable a UE 115 to prioritize cells in a cell selection or reselection procedure according to one or more respective capabilities of the cells. For instance, cells that support dual connectivity and/or carrier aggregation (e.g., NRDC cells, NEDC cells, NRCA cells) may inherently have higher throughput and data rates as compared to cells without such capabilities. Additionally, some configured capabilities of a cell may provide improved performance. As an example, a cell configured with a relatively higher quantity of carriers, aggregated bandwidth, and/or quantity of MIMO layers may provide increased throughput and, subsequently, increased efficiency. The UE 115 may assign a respective cell selection priority to each cell based on one or more capabilities of each cell. For example, the UE 115 may assign a relatively higher cell selection priority to an NRDC, NEDC, or NRCA cell than to a cell that lacks dual connectivity or carrier aggregation capabilities. During the cell selection or reselection procedure, the UE 115 may search for and select a cell based on the corresponding priority. In some cases, the UE 115 may store the assigned cell selection priorities in a data structure at the UE 115, where the data structure indicates the respective cell selection priorities. The data structure may be an example of or included as part of an ACQ-DB.

In some examples, the UE 115 may assign respective cell selection priorities based on additional criteria or parameters such as respective power levels, RSRPs, cell types, associated RATs, or the like. For instance, the UE 115 may assign a higher priority to NR cells than to LTE cells. Additionally, or alternatively, the UE 115 may assign a higher cell selection priority to a current serving cell of the UE 115. In some cases, the UE 115 may determine capabilities of a cell based on information stored at the UE 115 (e.g., within a database, such as an ACQ-DB) or received as part of system information from the cell (e.g., as part of an SSB or a system information block (SIB)), for instance, during a frequency scan. For example, the UE 115 may identify a group of cells on which the UE 115 had previously camped. The UE 115 may assign a respective cell selection priority to each cell in the group of cells.

Additionally, or alternatively, a network entity, such as a base station 105, of the wireless communications system 100 may indicate cell configuration information and/or cell selection priority information to the UE 115; the UE 115 may assign respective cell selection priorities based on the indication(s). In some examples, the base station 105 may transmit control signaling indicating whether each cell supports one or more capabilities, and the UE 115 may assign respective priorities to each cell based on the corresponding capability (or capabilities). Alternatively, the base station 105 may transmit control signaling (e.g., system information) indicating the respective priorities and the UE 115 may assign the indicated respective priorities to the corresponding cells. For example, a network entity, such as a base station 105 may advertise certain cell information (e.g., NEDC cell information, NRDC cell information, NRCA cell information) via a SIB. As such, when a UE 115 moves to an idle mode, the UE 115 may give more priority to NEDC cells or NRDC cells compared to other NR and intra-RAT (IRAT) cells.

Based on the respective cell selection priorities, the UE 115 may perform a cell search (e.g., frequency scan) to find a suitable cell. For example, the UE 115 may perform the cell search in ascending order of the priorities as indicated by the data structure, such that the UE 115 searches (e.g., scans) cells associated with a higher priority before cells associated with a lower priority and/or more frequently than cells associated with a lower priority. The UE 115 may determine whether a cell is a suitable cell by determining whether the cell fulfills the cell selection criteria. Once the UE 115 finds a suitable cell, the UE 115 may select that cell and attempt to camp on the selected cell. For instance, the UE 115 may begin to monitor a control channel of the selected cell and, in some cases, may register with (i.e., attach to) the selected cell.

Figure 2:
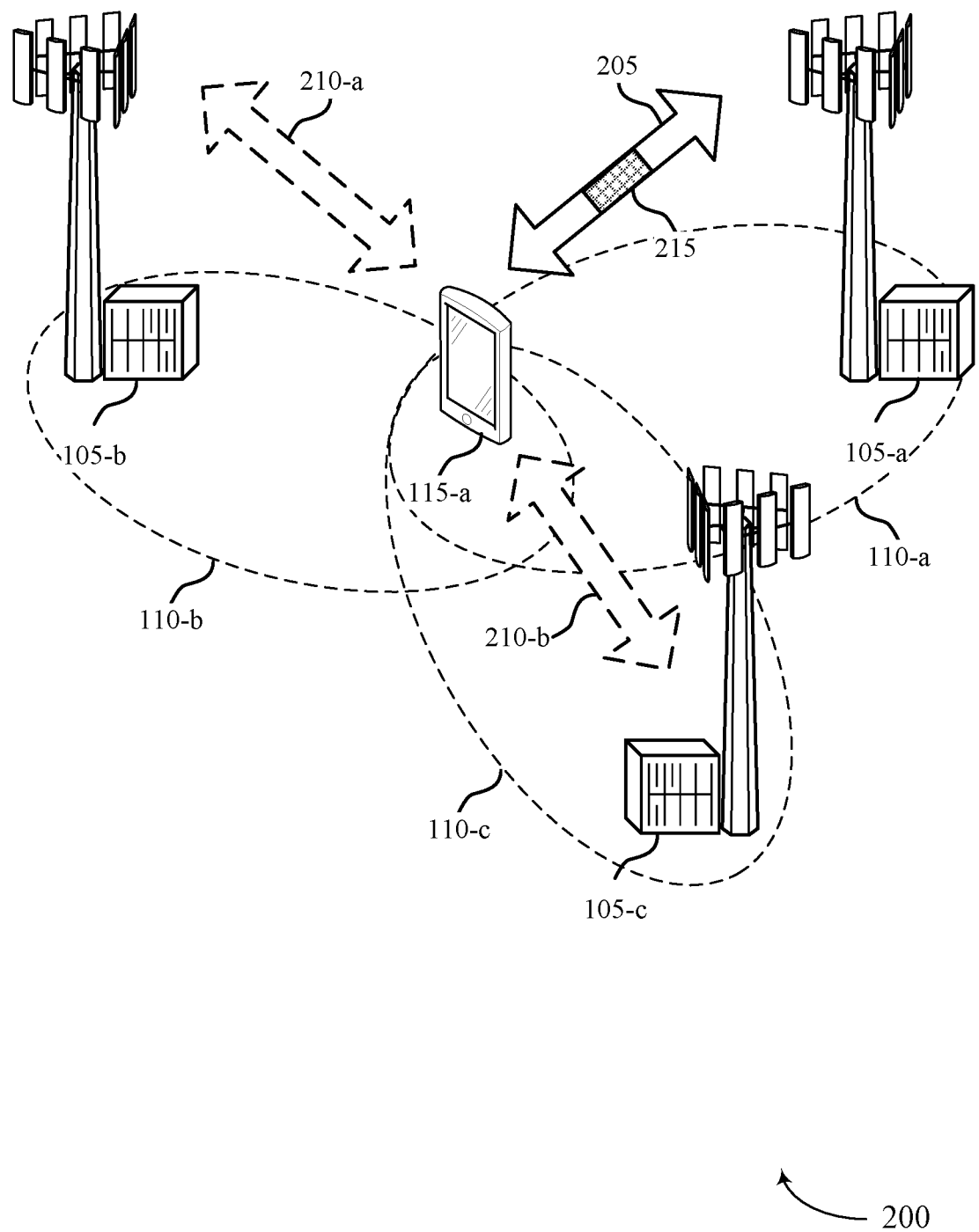

FIG. 2 illustrates an example of a wireless communications system 200 that supports capability-based cell prioritization for cell selection and reselection in accordance with aspects of the present disclosure. In some examples, the wireless communications system 200 may implement aspects of wireless communications system 100. For instance, a base station 105-*a*, a base station 105-*b*, and a base station 105-*c* that may be examples of base stations 105 as described with reference to FIG. 1 and a UE 115-*a* may be an example of a UE 115 as described with reference to FIG. 1. The UE 115-*a* and the base stations 105 may each support one or more RATs (e.g., LTE, NR, etc.).

Each base station 105 in the wireless communications system 200 may be associated with at least one cell 110, and each cell 110 may correspond to a coverage area within which a base station 105 may provide coverage to the UE 115-*a*. As illustrated, the base station 105-*a* may correspond to a cell 110-*a*, the base station 105-*b* may correspond to a cell 110-*b*, and the base station 105-*c* may correspond to a cell 110-*c*. The UE 115-*a* may operate in an RRC connected mode and may communicate with the base station 105-*a* via an established communication link 205. The UE 115-*a* may move within the coverage area and the cell 110-*a* may provide wireless communications to the UE 115-*a*.

The UE 115-*a* may support communication with a base station 105 according to one or more RATs. For example, the UE 115-*a* may communicate according to LTE, NR, among other types of RATs. The UE 115-*a* may communicate with a base station 105 on one or more radio frequency spectrum bands within a frequency range. For example, FR1 may span from about 410 MHz to 7125 MHz, FR2 may span from about 24250 MHz to 52600 MHz, FR3 may be between FR1 and FR2, from about 7125 MHz to 24250 MHz, and FR4 and FR5 may be at higher frequencies (e.g., higher than FR2). The different FRs may provide different data rates. For example, FRs with higher frequencies may provide higher data rates, but the higher frequencies may also have a shorter communication range.

The UE 115-*a* may perform a cell selection or reselection procedure in the wireless communications system 200 to find and select a cell on which to camp. For example, there may be no data activity between the UE 115-*a* and the base station 105-*a* and the UE 115-*a* may transition to an RRC idle or RRC inactive mode. While in the RRC idle or RRC inactive mode, the UE 115-*a* may camp on the cell 110-*a*. Here, the UE 115-*a* may monitor a control channel of the base station 105-*a* (i.e., of the cell 110-*a*) while also performing a cell reselection procedure to search for a potential suitable cell (e.g., a better cell than the cell 110-*a*). Alternatively, the UE 115-*a* may power off; upon returning to a power on state, the UE 115-*a* may perform a cell selection procedure to select a cell on which to camp. During cell selection or reselection, the UE 115-*a* may search among available cells, for instance, by performing a frequency scan, to find a suitable cell (e.g., a cell that satisfies one or more cell selection criteria).

In the example of FIG. 2, the UE 115-*a* may camp on the cell 110-*a*, and the cell 110-*b* and the cell 110-*c* may be available candidate cells. That is, the UE 115-*a* may search, during a cell selection or reselection procedure, from among a group of cells that includes at least the cells 110-*b* and 110-*c*. The UE 115-*a* may search for a cell at each carrier frequency of a frequency band or group; upon finding a suitable cell, the UE 115-*a* may select the cell and attempt to camp on the cell. According to the techniques described herein, the UE 115-*a* may prioritize available (i.e., candidate) cells during a cell selection or reselection procedure based on one or more capabilities of the available cells. Additionally, the UE 115-*a* may deprioritize candidate cells that lack one or more capabilities. The UE 115-*a* may assign a cell selection priority to each cell of a group of cells and may store priority information in a database at the UE 115-*a*. The UE 115-*a* may, for example, assign relatively higher priorities to cells with capabilities such as carrier aggregation or dual connectivity, and may assign relatively lower priorities to cells that lack carrier aggregation or dual connectivity. The UE 115-*a* may search for and select a cell based on the assigned priorities, which may enable the UE 115-*a* to select a cell that provides increased throughput and efficiency.

The UE 115-*a* may identify a group of cells available for selection. In some examples, the group of cells may be comprised of cells on which the UE 115-*a* has previously camped, and in some cases, may include cells for which the UE 115-*a* has stored information (e.g., as part of an ACQ-DB). The UE 115-*a* may determine capabilities, system information, or other parameters for each available cell, e.g., based on the stored information and/or performing a cell search (e.g., frequency scan). The UE 115-*a* may assign a respective cell selection priority to each cell in the group of cells based on a capability of each cell, such as a dual connectivity capability, a carrier aggregation capability, or a combination thereof. Additionally, in some examples, the UE 115-*a* may assign a respective cell selection priority to each cell based on an associated RAT of the cell, a respective recency of the UE 115-*a* camping on the cell, a respective bandwidth capability (e.g., an aggregated bandwidth), a respective MIMO layer capability, a respective cell type, a respective RSRP, a respective power level, or any combination thereof. In some examples, the UE 115 may assign a higher priority to NEDC and NRDC cells compared to other RAT cells (e.g., in an ACQ-DB) based a respective power level and a last camped NEDC cell or NRDC cell based on a cell scan.

In the example of FIG. 2, the cell 110-*b* may be an example of an NRDC cell (e.g., may utilize NR and have a dual connectivity capability) and the cell 110-*c* may be an example of an LTE cell that lacks a dual connectivity capability. According to the techniques described herein, the UE 115-*a* may assign a higher priority to the cell 110-*b* than the cell 110-*c* based on the capability (or lack thereof) and the associated RAT of each cell 110. The UE 115-*a* may select the cell 110-*b* based on the cell 110-*b* having a higher priority, and may camp on the cell 110-*b* (e.g., after completing the cell selection or reselection process). The UE 115-*a* may monitor a control channel of the cell 110-*b* (e.g., of the base station 105-*b*). Additionally, in some examples, the UE 115-*a* may register with or otherwise attach to the cell 110-*b*. For instance, the UE 115-*a* may perform a NAS registration procedure, a location registration procedure, an attach procedure, or the like. In some cases, the UE 115-*a* may continue to camp on the cell 110-*b* while operating in an RRC idle or RRC inactive mode and may regularly search for other suitable cells (e.g., relatively more suitable cells) according to a configured periodicity. If the UE 115-*a* finds a more suitable cell than the cell 110-*b*, the UE 115-*a* may reselect to the more suitable cell. In some other cases, the UE 115-*a* may transition to an RRC connected mode by establishing a connection with the cell 110-*b* via the communication link 210-*a*.

Information (e.g., capability information, configuration information, cell type information, power level information, etc.) used by the UE 115-*a* in priority assignment may be obtained from the cells themselves, information stored (e.g., in a database) at the UE 115-*a*, or indicated via control signaling 215. In some examples, the UE 115-*a* may receive an SSB or other reference signal from a cell during a frequency scan and may measure an RSRP or other power level. For instance, the UE 115-*a* may receive a reference signal from the cell 110-*b* associated with the cell 110-*b* via a communication link 210-*a* and a reference signal from the base station 105-*c* associated with the cell 110-*c* via the communication link 210-*b*. The UE 115-*a* may measure the reference signals to determine the RSRP, power level, or the like.

In some other examples, the UE 115-*a* may maintain a database including information related to cells on which the UE 115-*a* has previously camped or otherwise connected to. Here, the UE 115-*a* may access stored parameters for each cell, such as configuration information (which may include capability information, such as a quantity of supported MIMO layers, an aggregated bandwidth, a quantity of configured carriers, or the like), an associated RAT, and/or a cell type. For instance, the UE 115-*a* may have previously camped on (or otherwise connected to) the cell 110-*b* and the cell 110-*c* and may have stored cell parameters associated with each cell 110.

In other examples, a network entity such as the base station 105-*a* may transmit control signaling 215 to the UE 115-*a* indicating cell information associated with the cell 110-*a* (e.g., corresponding to the base station 105-*a*) and/or other cells 110. In some cases, the control signaling 215 may indicate configuration information for each cell, one or more capabilities of each cell, or other parameters, and the UE 115-*a* may use the control signaling 215 to determine assigned cell selection priorities. In other cases, the control signaling 215 may directly indicate respective cell selection priorities for the UE 115-*a* to assign.

In any example, the UE 115-*a* may assign a cell selection priority to a cell based on the determined information. Some capabilities or parameters may be associated with higher priorities than other capabilities or parameters such that the UE 115-*a* searches for and selects cells in accordance with the priorities and based on the capabilities or parameters. For example, the UE 115-*a* may assign higher cell selection priorities to cells associated with a first RAT than cells associated with a second RAT based on the UE 115-*a* supporting or otherwise preferring the first RAT. Additionally, the UE 115-*a* may assign higher cell selection priority to cells having a relatively greater bandwidth capability (e.g., an aggregated bandwidth), as a greater bandwidth may support increased throughput. In some cases, the UE 115-*a* may assign a higher cell selection priority to a current serving cell of the UE 115-*a* (i.e., a cell on which the UE 115-*a* is currently camped). For instance, the UE 115-*a* may assign a higher priority to the cell 110-*a* than the cell 110-*b* or the cell 110-*c* based on the UE 115-*a* currently camping on the cell 110-*a*.

In some aspects, the UE 115-*a* may identify subsets of cells from the group of cells based on the corresponding capabilities. The UE 115-*a* may assign priorities across subsets of cells in addition to within subsets of cells. For example, the UE 115-*a* may determine that each cell in a first subset of cells has at least one capability of a set of capabilities (e.g., a carrier aggregation capability, a dual connectivity capability, etc.). The UE 115-*a* may likewise determine a second subset of cells different from the first subset of cells; in some cases, the second subset of cells may each lack each of the one or more capabilities (that is, each cell of the second subset of cells may not have any of the one or more capabilities). The UE 115-*a* may assign cell selection priorities across the first and second subsets based on each cell in the first subset of cells having at least one capability of the one or more capabilities, e.g., by assigning each cell in the first subset of cells a relatively higher respective cell selection priority than each cell in the second subset of cells. In some cases, the UE 115-*a* may identify subsets of cells based on respective associated RATs, where the UE 115-*a* may assign a higher respective cell selection priority to cells within a subset associated with a preferred RAT. For instance, the UE 115-*a* may identify a first subset of cells that supports NR and a second subset of cells that supports LTE; the UE 115-*a* may accordingly prioritize cells belonging to the first subset over the second subset.

The UE 115-*a* may prioritize cells within a subset of cells based on one or more additional cell selection criteria. For instance, within the first subset of cells, the UE 115-*a* may assign a higher respective cell selection priority to each cell based on a respective recency of the UE 115-*a* camping on one or more cells. Additionally, or alternatively, the UE 115-*a* may assign respective cell selection priorities to each cell within the first subset of cells based on a respective bandwidth capability, MIMO layer capability, RSRP, cell type, or the like. The UE 115-*a* may similarly assign respective cell selection priorities to each cell within the second subset of cells (e.g., based on the same cell selection criteria).

In some examples, the cell selection priorities assigned by the UE 115-*a* may be used in conjunction with network configured priorities. For example, the UE 115-*a* may be configured to prioritize searching cells based on an order of recency, e.g., by prioritizing cells on which the UE 115-*a* most recently camped. The UE 115-*a* may still assign a higher cell selection priority to each cell in the first subset of cells than each cell in the second subset of cells. However, within the first subset of cells, the UE 115-*a* may assign respective cell selection priorities to each cell based on the order of recency.

The UE 115-*a* may assign the respective cell selection priorities within a data structure stored at the UE 115-*a*, as described in greater detail with reference to FIG. 3. That is, the UE 115-*a* may store an indication of the respective cell selection priority for each cell within the data structure at the UE 115-*a*. During cell selection or reselection, the UE 115-*a* may reference the data structure to search for and/or select cells based on the assigned cell selection priorities. For example, the UE 115-*a* may search for cells in order of the assigned priorities, where the UE 115-*a* begins by scanning a first cell associated with a highest priority. If the first cell satisfies cell selection criteria, such as a threshold RSRP, the UE 115-*a* may select the first cell on which to camp. If this cell fails to satisfy the cell selection criteria, the UE 115-*a* may scan the next cell in order of the associated cell selection priorities.

Additionally, in some examples, the UE 115-*a* may adjust a periodicity of a cell search based on the assigned cell selection priorities. In such examples, the UE 115-*a* may search for cells associated with higher cell selection priorities more frequently than cells associated with lower cell selection priorities. For instance, the UE 115-*a* may perform a cell search according to a configured periodicity, but may increase the periodicity for cells with a higher cell selection priority.

FIG. 3 illustrates an example of a data structure 300 that supports capability-based cell prioritization for cell selection and reselection in accordance with aspects of the present disclosure. In some examples, the data structure 300 may implement aspects of the wireless communications system 100 and/or the wireless communications system 200. For example, the data structure 300 may indicate respective cell selection priorities for a set of cells 301 available for a cell selection or reselection procedure at a UE, such as a UE 115, as described with reference to FIGS. 1 and 2. The data structure 300 may be generated, stored, and updated at the UE.

As described with reference to FIG. 2, the UE may identify a set of cells 301 (e.g., cells on which the UE has previously camped) and may determine whether each cell of the set of cells 301 has one or more capabilities, lacks one or more capabilities, or a combination thereof. For example, the UE 115 may identify a first subset of cells 305-*a* and a second subset of cells 305-*b*. The UE may determine that each cell (e.g., Cell A, Cell B, and Cell C) within the first subset of cells 305-*a* has at least one capability of a set of one or more capabilities. The one or more capabilities may include capabilities that the UE prefers, for instance, based on performance parameters associated with the one or more capabilities. For example, the one or more capabilities may include, but are not limited to, a dual connectivity capability, a carrier aggregation capability, or the like, that provide increased throughput and improved communications efficiency. In some cases, the UE may likewise determine that each cell (e.g., Cell D, Cell E) within the second subset of cells 305-*b* lacks each capability of the one or more capabilities. Thus, each cell in the second subset of cells 305-*b* may be assigned lower respective cell selection priority than each cell in the first subset of cells 305-*a*.

In some cases, the UE 115 may also identify a third subset of cells 305-*c*, and each cell in the third subset of cells 305-*c* may be assigned lower respective cell selection priority than each cell in the second subset of cells 305-*b* (and hence also lower than the respective cell selection priority of each cell in the first subset of cells 305-*a*). For example, the cells in the first subset of cells 305-*a* and the second subset of cells 305-*b* may all be associated with a first RAT (e.g., 5G or NR), while the cells in the third subset of cells 305-*c* may all be associated with a second RAT (e.g., LTE).

The determination by the UE of the capabilities may be based on configuration information associated with each cell and/or control signaling received at the UE from a network entity. The UE may receive control signaling (e.g., system information, such as a SIB) from a network entity, such as a base station, that indicates a respective configuration, a respective cell selection priority, respective capabilities, or a combination thereof, for each cell in the set of cells 301. For instance, the base station may identify a respective configuration for each cell within the set of cells 301. The base station may transmit control signaling that indicates whether each cell within the set of cells 301 has at least one capability of the one or more capabilities (e.g., indicates that each cell within the set of cells 301 has a respective capability of the one or more capabilities, indicates that each cell within the set of cells 301 lacks a respective capability of the one or more capabilities, or a combination thereof). Additionally, the control signaling may indicate configured parameters for each cell, such as a configured bandwidth capability, a configured quantity of carriers, a quantity of MIMO layers supported by the cell, a cell type, or the like.

The UE may assign (e.g., within the data structure 300 at the UE) a respective cell selection priority for each cell in the set of cells 301 based on the associated respective capability (or lack thereof). For instance, the UE may store an indication of the respective cell selection priority for each cell in the set of cells 301 in the data structure 300. In some cases, the UE may assign (e.g., store indications of) respective cell selection priorities based on a prioritization scheme that includes a set of cell selection priorities corresponding to one or more capabilities, one or more configured parameters, or a combination thereof. For example, the prioritization scheme may include three levels of cell selection priority, where a first cell selection priority (e.g., a highest priority) corresponds to a cell supporting a first RAT (e.g., NR) and a capability, such as a dual connectivity capability, a carrier aggregation capability, or a combination thereof. A second cell selection priority lower than the first cell selection priority may correspond to a cell supporting the first RAT but lacking the capability, while a third cell selection priority (e.g., a lowest priority) may correspond to a cell supporting a second RAT (e.g., LTE) different from the first RAT and lacking the capability. Accordingly, the UE may assign the first cell selection priority to one or more cells based on the one or more cells supporting the RAT and the capability. The UE may assign the second cell selection priority to one or more cells that support the RAT but lack the capability, and may assign the third cell selection priority to one or more cells based on the one or more cells lacking each capability and supporting the second RAT.

As illustrated in FIG. 3, the UE may assign a higher respective cell selection priority to each cell in the first subset of cells 305-*a* than each cell in the second subset of cells 305-*b* based on each cell in the first subset of cells 305-*a* having at least one capability of the one or more capabilities. In some examples, the UE may assign a lower respective cell selection priority to each cell in the second subset of cells 305-*b* than to each cell in the first subset of cells 305-*a* based on each cell in the second subset of cells 305-*b* lacking each capability of the one or more capabilities. The UE may store the data structure 300 at the UE, after which the UE may select a cell within the set of cells 301 based on the respective cell selection priority for the cell within the data structure 300. The UE may then attempt to camp on the selected cell.

In some examples, the UE may assign the respective cell selection priorities for each of the cells in the set of cells 301 based on receiving control signaling from the base station. If the control signaling indicates capabilities or other configuration information for each cell, the UE may determine and assign the respective cell selection priorities based on the indication(s) in the control signaling. Alternatively, the control signaling may directly indicate respective cell selection priorities for each cell in the set of cells 301 for the UE to use; here, the UE may assign the cell selection priorities in the data structure 300 as indicated by the control signaling.

The UE may assign, within the data structure 300, respective cell selection priorities across subsets of cells 305 as well as within subsets of cells 305. As illustrated in FIG. 3, each cell in the first subset of cells 305-*a* has a higher respective cell selection priority than each cell in the second subset of cells 305-*b* based on each cell in the first subset of cells 305-*a* having at least one capability of the one or more capabilities. The first subset of cells 305-*a* and the second subset of cells 305-*b* may both support a first RAT (e.g., NR), and the third subset of cells 305-*c* may support a second RAT (e.g., LTE). The UE may assign each cell in the third subset of cells 305-*c* a relatively lower respective cell selection priority than each cell in the first subset of cells 305-*a* or the second subset of cells 305-*b*. Put another way, the respective cell selection priorities assigned to cells in the first subset of cells 305-*a* may be relatively higher than respective cell selection priorities assigned to cells in the second subset of cells 305-*b*, and the respective cell selection priorities assigned to cells in the second subset of cells 305-*b* may further be relatively higher than the respective cell selection priorities assigned to cells in the third subset of cells 305-*c*. In this example, the UE may avoid switching to a cell with a different RAT by prioritizing searching and selecting cells associated with the first RAT (e.g., cells in the first subset of cells 305-*a* or the second subset of cells 305-*b*) before searching and selecting cells associated with the second RAT (e.g., cells in the third subset of cells 305-*c*).

Other parameters that may define assignation of respective cell selection priorities may include a bandwidth capability, a MIMO layer capability, an RSRP value, a power level, a cell type, an associated RAT, a recency of the UE camping on one or more cells, or the like, among other examples. Additionally, the UE may assign cell selection priorities based on any combination of the examples described herein or in any order. For instance, the UE may assign cell selection priorities based on a carrier aggregation capability first, followed by a bandwidth capability second, a quantity of configured carriers third, and a power level fourth.

Within each subset of cells 305, the UE may assign respective cell selection priorities to each cell based on other capabilities or parameters as described herein. That is, in addition to assigning respective cell selection priorities to subsets of cells 305, the UE may assign respective cell selection priorities to each cell within a subset of cells 305. For instance, in the first subset of cells 305-*a*, Cell B may have a greater aggregated bandwidth than Cell C and Cell A; a cell with a relatively higher bandwidth capability may be capable of increased throughput and a higher data rate. The UE may therefore assign Cell B a relatively higher respective cell selection priority than Cell C or Cell A. Similarly, a cell with a greater quantity of configured carriers or a greater quantity of MIMO layers may be capable of increased frequency diversity and improved throughput. Cell C may support more carriers or MIMO layers than Cell A, and the UE may assign Cell C a higher respective cell selection priority than Cell A. In this example, though Cell A, Cell B, and Cell C have different respective cell selection priorities, each of Cell A, Cell B, and Cell C may still have a relatively higher cell selection priority than any cell in the second subset of cells 305-*b*, e.g., based on Cell A, Cell B, and Cell C belonging to the first subset of cells 305-*a*.

In the second subset of cells 305-*b*, Cell E may have a higher power level than Cell D, and the UE may assign a higher respective cell selection priority to Cell E than to Cell D. Likewise, within the third subset of cells 305-*c*, the UE may assign a higher respective cell selection priority to Cell F than to Cell G, e.g., based on respective power levels. Further, Cell F and Cell G may both have relatively lower respective cell selection priorities than any cell in the first subset of cells 305-*a* or the second subset of cells 305-*b* based on Cell F and Cell G belonging to the third subset of cells 305-*c*.

In some examples, the UE may perform a cell search based on the respective cell selection priority of each cell within the set of cells 301. Here, the UE may search for cells in order of the respective cell selection priorities. For instance, when performing a cell search, the UE may search for Cell B before searching for any other cells in the set of cells 301. The UE may determine whether Cell B satisfies one or more cell selection criteria to be considered a suitable cell. If so, the UE may select and attempt to camp on Cell B. If not, the UE may search for the next cell according to the cell selection priorities, e.g., Cell C; the UE may continue to search among the cells in the set of cells 301 until the UE finds a suitable cell to select.

Additionally, or alternatively, the UE may search for cells associated with higher respective cell selection priorities more frequently than cells associated with lower respective cell selection priorities. For example, the UE may be configured to perform a cell search according to a configured periodicity (e.g., every 1 second); the UE may search for cells associated with higher respective cell selection priorities more frequently (e.g., every 500 ms) than the configured periodicity. In the example of FIG. 3, the UE may search for each cell within the first subset of cells 305-*a* more frequently than each cell within the second subset of cells 305-*b*.

In some examples, a UE may to change a search and measurement periodicity of a RAT. So, if the UE is in inactive mode (e.g., an RRC inactive mode) and finds NR cells for measurement other than NEDC and NRDC cells, the UE can slow down the search and measurement period for the NR cells other than the NEDC and NRDC cells by increasing the periodicity of search and measurement to avoid early reselection to an NR cell configured in SIB. As such, the UE may prioritize more NEDC and NRDC cells and not move to other NR cells. So, if the UE could not be able to find any cells and move to out of service (OOS) then the UE can give priority to NEDC and NRDC cells to reacquire service.

The UE may maintain and update the data structure 300 over time. For instance, the UE may obtain configuration information for a given cell when a UE connects to that cell; the UE may assign or update an assigned cell selection priority for the cell based on the configuration information. The UE may assign, or update assigned cell selection priorities for cells based on receiving system information, performing cell measurements (e.g., during a cell search or frequency scan), or the like. For instance, during a cell search, the UE may obtain an updated RSRP measurement of Cell B; even if Cell B is not considered a suitable cell, the UE may update the respective cell selection priority in the data structure 300 based on the updated RSRP measurement. Maintaining the data structure 300 in this manner may enable the UE to avoid having to wait to receive system information for each cell during a cell search in order to assign respective cell selection priorities.

Figure 4:
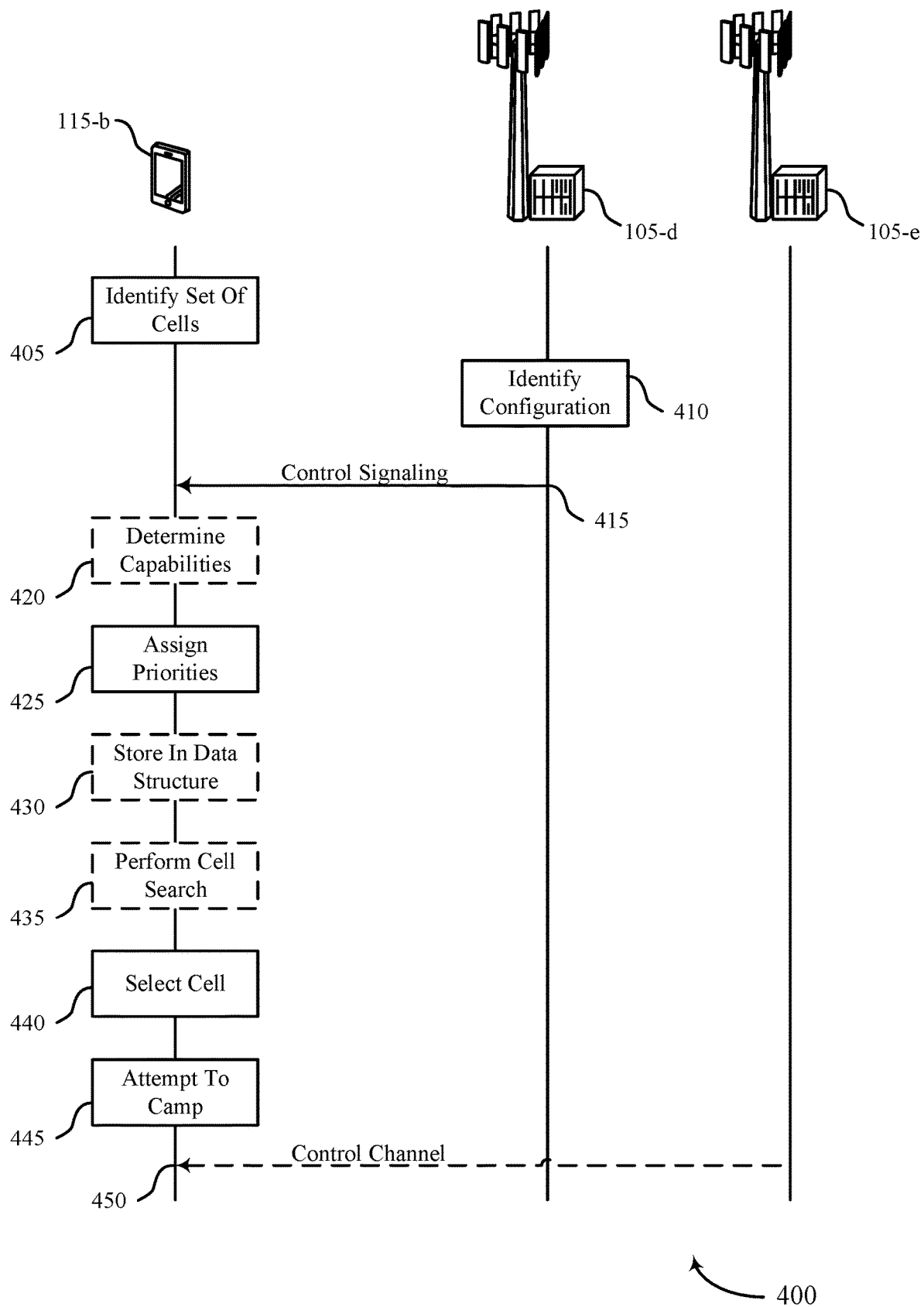
FIG. 4 illustrates an example of a process flow that supports capability-based cell prioritization for cell selection and reselection in accordance with aspects of the present disclosure.

FIG. 4 illustrates an example of a process flow 400 that supports capability-based cell prioritization for cell selection and reselection in accordance with aspects of the present disclosure. In some examples, the process flow 400 may implement aspects of the wireless communications system 100 and/or the wireless communications system 200. For example, the process flow 400 may include a base station 105-*d*, a base station 105-*e*, and a UE 115-*b*, which may be examples of devices as described with reference to FIGS. 1 and 2. In the example of FIG. 4, the UE 115-*b* may support communications using one or multiple RATs, while the base station 105-*d* and the base station 105-*e* may each be associated with one or more cells.

In the following description of the process flow 400, the operations performed by the base station 105-*d*, the base station 105-*e*, and the UE 115-*b* may be performed in different orders or at different times than the exemplary order shown. Some operations may also be omitted from the process flow 400, or other operations may be added to the process flow 400. Further, while operations in the process flow 400 are illustrated as being performed by the base station 105-*d*, the base station 105-*e*, and the UE 115-*b*, the examples herein are not to be construed as limiting, as the described features may be associated with any number of different devices.

At 405, the UE 115-*b* may identify a set of cells available for cell selection or reselection. In some examples, the set of cells may include one or more cells on which the UE 115-*b* had previously camped. The set of cells may include at least one cell associated with the base station 105-*d* and at least one cell associated with the base station 105-*e*. The set of cells may include at least a first subset of cells and a second subset of cells different from the first subset of cells. Each cell of the first subset of cells may have at least one capability of one or more capabilities, which may include, but is not limited to, a dual connectivity capability, a carrier aggregation capability, or any combination thereof. In some examples, each cell within the first subset of cells and each cell within the second subset of cells is associated with a first RAT. The set of cells may include a third subset of cells that is different from the first subset of cells and the second subset of cells; each cell within the third subset of cells may be associated with a second RAT that is different from the first RAT.

At 410, the base station 105-*d* may identify a respective configuration for each cell within the set of cells. At 415, in some examples, the base station 105-*d* may transmit, and the UE 115-*b* may receive, control signaling that indicates respective cell selection priorities for each cell within the set of cells. In some examples, the base station 105-*d* may transmit, and the UE 115-*b* may receive, within the control signaling, an indication of whether each cell within the set of cells at least one capability of the one or more capabilities. In some cases, the control signaling may include system information that indicates the respective cell selection priorities for each cell within the set of cells. Additionally, or alternatively, the base station 105-*d* may transmit, and the UE 115-*b* may receive, control signaling that indicates the respective configurations for each cell of the set of cells (e.g., as identified by the base station 105-*d* at 410) and thus may indicate which capabilities each cell has, and thereby whether the cell has at least one capability of the one or more capabilities.

At 420, the UE 115-*b* may determine one or more capabilities associated with one or more cells of the set of cells, e.g., based on the received control signaling (e.g., at 415) indicating the respective configuration for each cell of the set of cells. For instance, the UE 115-*b* may determine that each cell within the first subset of cells has at least one capability (e.g., of the one or more capabilities), that each cell within the second subset of cells lacks each capability of the one or more capabilities, or any combination thereof.

At 425, the UE 115-*b* may assign a respective cell selection priority for each cell within the set of cells. The UE 115-*b* may assign the respective cell selection priorities based on one or more criteria, e.g., based on whether a cell has at least one capability of the one or more capabilities, a recency of the UE 115-*b* camping on each cell, an RSRP, a cell type, a RAT associated with each cell, or a combination thereof. For instance, the UE 115-*b* may assign each cell within the first subset of cells a higher respective cell selection priority than each cell within the second subset of cells based on each cell within the first subset of cells having at least one capability of the one or more capabilities. Additionally, or alternatively, the UE 115-*b* may assign respective cell selection priorities to each cell within the first subset of cells based on a respective recency of the UE 115-*b* camping on each cell within the first subset of cells, a respective power level for each cell within the first subset of cells, a respective carrier aggregation capability, a respective dual connectivity capability, a respective bandwidth capability, a respective MIMO capability, a respective RSRP, a respective cell type, a respective associated RAT, or the like. In some examples, the UE 115-*b* may assign a higher respective cell selection priority to a current serving cell for the UE 115-*b* (e.g., a cell on which the UE 115-*b* is currently camped) than, for instance, each cell within the first subset of cells, the second subset of cells, or both.

The UE 115-*b* may assign respective cell selection priorities to any number of cells in any number of subsets of cells within the group of available cells. For example, the UE 115-*b* may assign a lower respective cell selection priority to each cell within the third subset of cells than each cell within the second subset of cells based on each cell in the third subset of cells being associated with the second RAT.

Additionally, in some examples, the UE 115-*b* may assign respective cell selection priorities within a subset of cells. That is, one cell within a subset may have a different cell selection priority than another cell within the same subset. For example, the UE 115-*b* may assign respective cell selection priorities to each cell based on one or more parameters corresponding to each cell, such that each cell within a subset has a different cell selection priority than each other cell within that same subset. For instance, the UE 115-*b* may assign a relatively higher cell selection priority to a first cell in the first subset of cells based on the first cell having a relatively higher power level than a second cell in the first subset of cells.

In some examples, the UE 115-*b* may assign the respective cell selection priorities based on the one or more indications (e.g., cell selection priority indications, cell configuration indications, capability indications, etc.) transmitted via the control signaling at 415. For example, if the control signaling indicates respective cell selection priorities for each of the one or more cells, the UE 115-*b* may assign the respective cell selection priorities to each cell in accordance with the control signaling.

At 430, the UE 115-*b* may store indications of the respective cell selection priorities for each of the one or more cells in a data structure at the UE 115-*b*, e.g., based on assigning the respective cell selection priorities at 425. At 435, the UE 115-*b* may perform cell searching based on the respective cell selection priority of each cell within the set of cells. In some examples, the UE 115-*b* may search for cells associated with a higher respective cell selection priority before searching for cells associated with a lower respective cell selection priority. Additionally, or alternatively, the UE 115-*b* may search for cells associated with a higher respective cell selection priority more frequently than cells associated with a lower respective cell selection priority. For example, the UE 115-*b* may search for each cell within the first subset of cells more frequently than each cell within the second subset of cells.

At 440, the UE 115-*b* may select a cell within the set of cells based on the respective cell selection priority for the cell, e.g., based on the corresponding indication of the respective cell selection priority within the data structure. In the example of FIG. 4, the UE 115-*b* may select a cell that is associated with the base station 105-*e* based on the cell having a higher respective cell selection priority than other cells within the set of cells. In some examples, the UE 115-*b* may select the cell based on the cell searching performed at 435.

At 445, the UE 115-*b* may attempt to camp on the selected cell. For example, the UE 115-*b* may monitor a control channel of the base station 105-*e*, such that the UE 115-*b* may receive one or more messages at 450. In some cases, based on successfully camping on the selected cell, the UE 115-*b* may receive paging or other messages from a network entity or establish an RRC connection with the base station 105-*e* via the control channel. In some examples, the UE 115-*b* may register with (e.g., attach to) the selected cell while camping on the selected cell.

Figure 5:
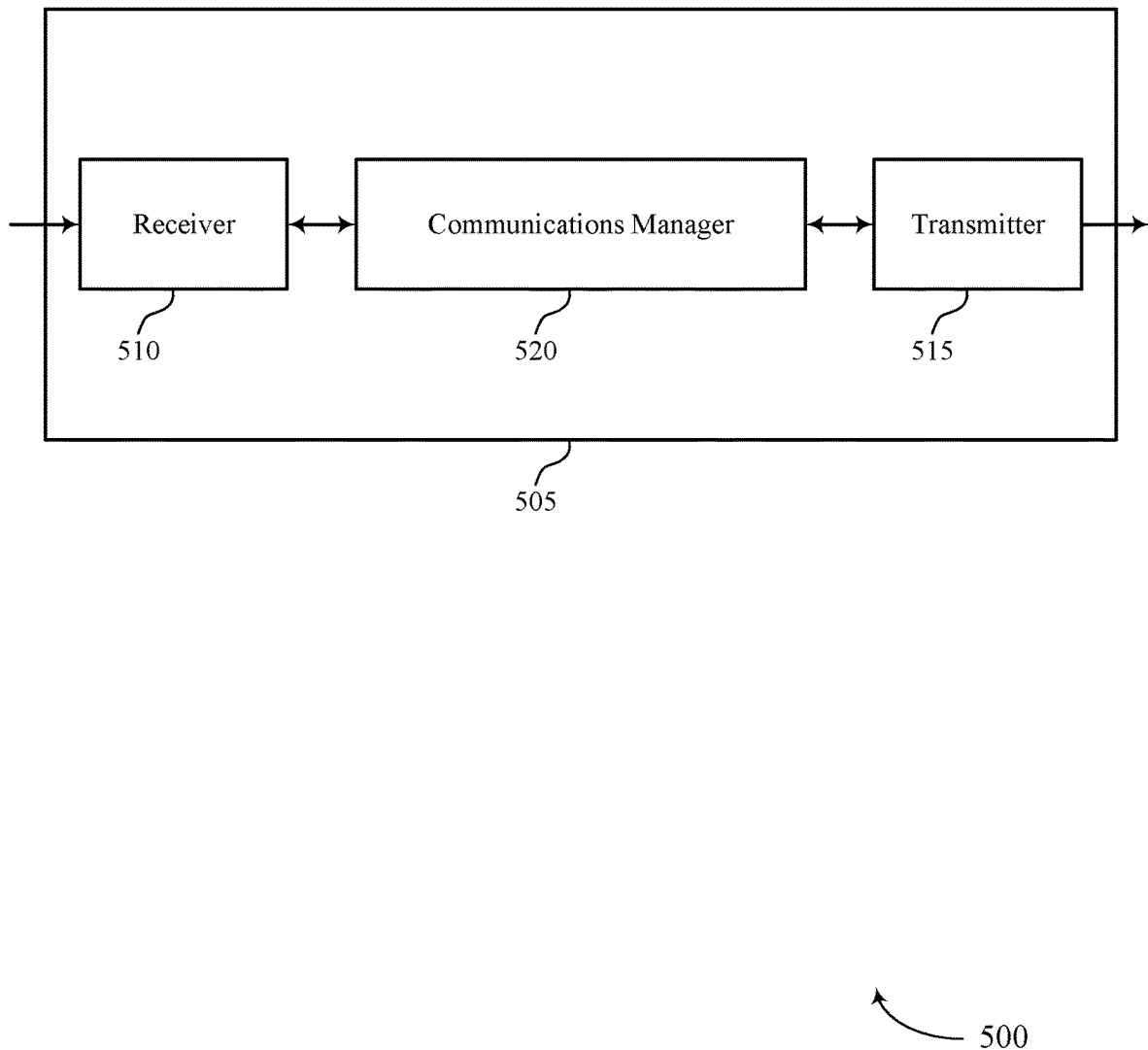
FIGS. 5 and 6 show block diagrams of devices that support capability-based cell prioritization for cell selection and reselection in accordance with aspects of the present disclosure.

FIG. 5 shows a block diagram 500 of a device 505 that supports capability-based cell prioritization for cell selection and reselection in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to capability-based cell prioritization for cell selection and reselection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to capability-based cell prioritization for cell selection and reselection). In some examples, the transmitter 515 may be co-located with a receiver 510 in a transceiver. The transmitter 515 may utilize a single antenna or a set of multiple antennas.

The communications manager 520, the receiver 510, the transmitter 515, or various combinations thereof or various components thereof may be examples of means for performing various aspects of capability-based cell prioritization for cell selection and reselection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 (e.g., a UE) in accordance with examples as disclosed herein. For example, the communications manager 520 may be configured as or otherwise support a means for identifying a set of cells including a first subset of cells that each have at least one capability of one or more capabilities and a second subset of cells different than the first subset of cells, each cell within the second subset of cells lacking each capability of the one or more capabilities. The communications manager 520 may be configured as or otherwise support a means for assigning a respective cell selection priority for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The communications manager 520 may be configured as or otherwise support a means for selecting a cell within the set of cells based on the respective cell selection priority for the cell. The communications manager 520 may be configured as or otherwise support a means for attempting to camp on the selected cell within the set of cells.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for cell prioritization in cell selection and reselection. The device 505 may give priority to cells that support capabilities that may improve performance. For example, the device 505 may prioritize selection of a cell that supports dual connectivity or carrier aggregation, thereby enabling the device 505 to camp on a cell with increased throughput (e.g., higher data throughput). Additionally, by prioritizing cell selection based on cell capabilities rather than signal power at the cell, the device 505 may avoid performing frequent cell reselection procedures (e.g., reducing delay due to unnecessary cell transitions), which may occur when a power level of another available cell satisfies a threshold. That is, the device 505 may reduce power consumption and increase battery life by reducing an overall number of performed cell reselection procedures (e.g., avoiding unnecessary cell transitions). Additionally, the device 505 may provide improved user experience due to no interruptions in data.

Figure 6:
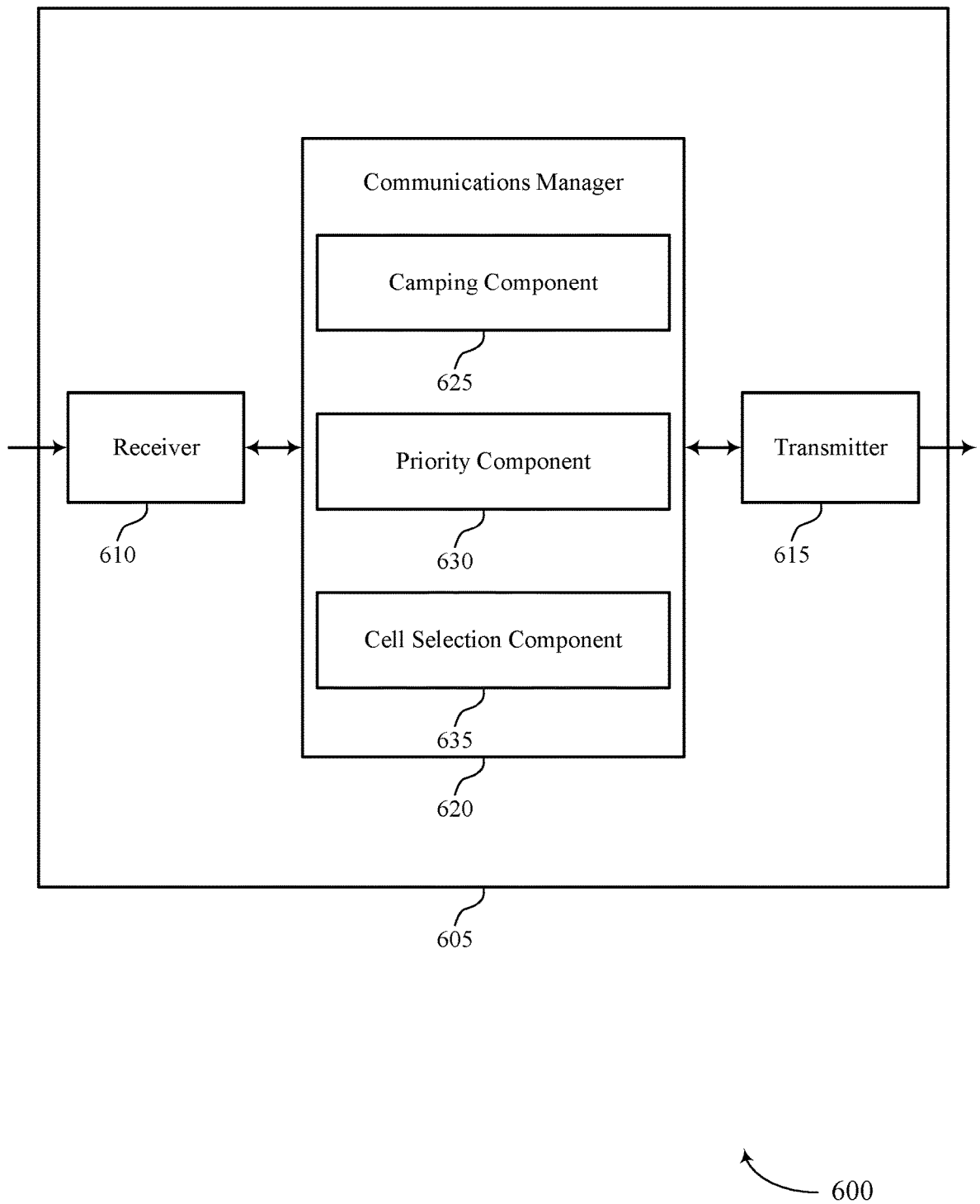

FIG. 6 shows a block diagram 600 of a device 605 that supports capability-based cell prioritization for cell selection and reselection in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to capability-based cell prioritization for cell selection and reselection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to capability-based cell prioritization for cell selection and reselection). In some examples, the transmitter 615 may be co-located with a receiver 610 in a transceiver. The transmitter 615 may utilize a single antenna or a set of multiple antennas.

The device 605, or various components thereof, may be an example of means for performing various aspects of capability-based cell prioritization for cell selection and reselection as described herein. For example, the communications manager 620 may include a camping component 625, a priority component 630, a cell selection component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The camping component 625 may be configured as or otherwise support a means for identifying a set of cells including a first subset of cells that each have at least one capability of one or more capabilities and a second subset of cells different than the first subset of cells, each cell within the second subset of cells lacking each capability of the one or more capabilities. The priority component 630 may be configured as or otherwise support a means for assigning a respective cell selection priority for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The cell selection component 635 may be configured as or otherwise support a means for selecting a cell within the set of cells based on the respective cell selection priority for the cell. The camping component 625 may be configured as or otherwise support a means for attempting to camp on the selected cell within the set of cells.

Figure 7:
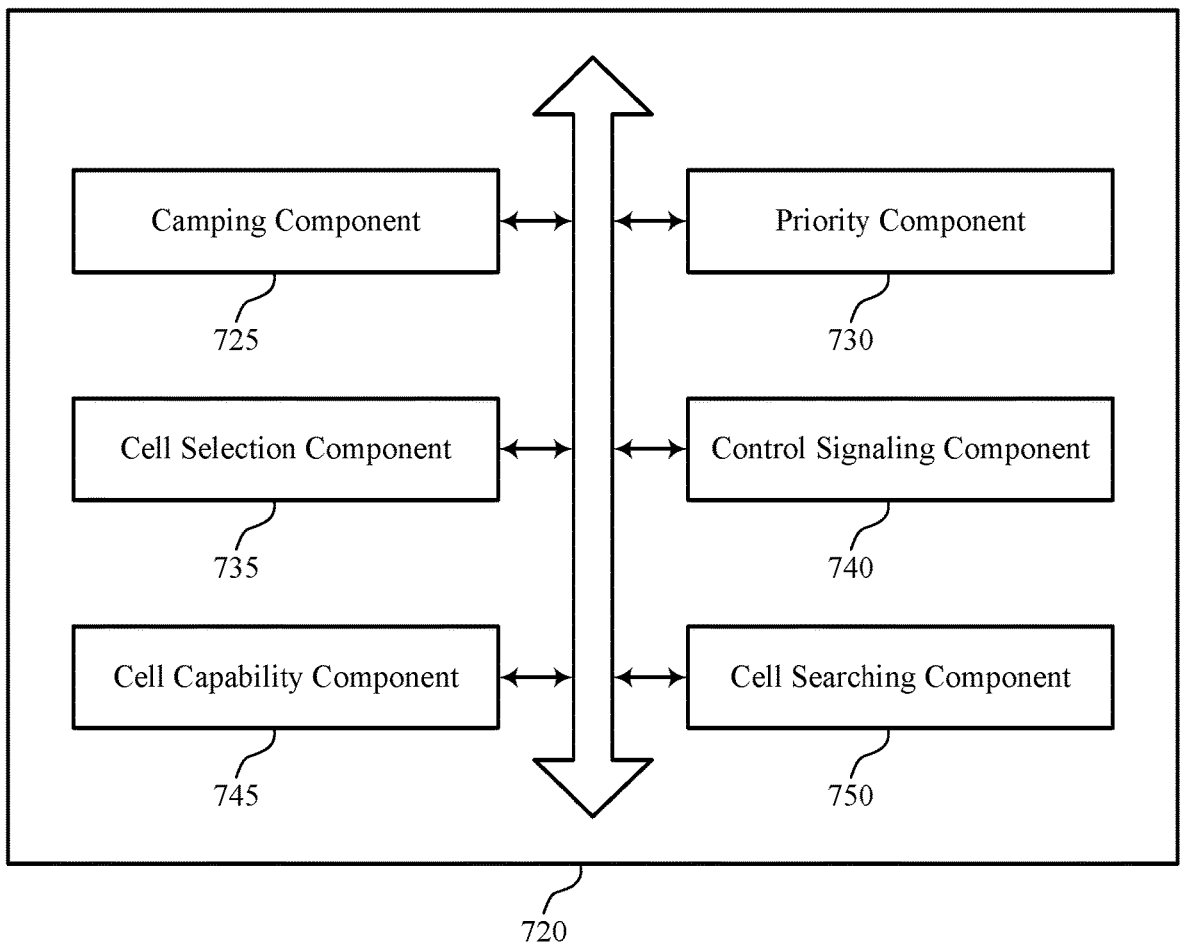
FIG. 7 shows a block diagram of a communications manager that supports capability-based cell prioritization for cell selection and reselection in accordance with aspects of the present disclosure.

FIG. 7 shows a block diagram 700 of a communications manager 720 that supports capability-based cell prioritization for cell selection and reselection in accordance with aspects of the present disclosure. The communications manager 720 may be an example of aspects of a communications manager 520, a communications manager 620, or both, as described herein. The communications manager 720, or various components thereof, may be an example of means for performing various aspects of capability-based cell prioritization for cell selection and reselection as described herein. For example, the communications manager 720 may include a camping component 725, a priority component 730, a cell selection component 735, a control signaling component 740, a cell capability component 745, a cell searching component 750, or any combination thereof. Each of these components may communicate, directly or indirectly, with one another (e.g., via one or more buses).

The camping component 725 may be configured as or otherwise support a means for identifying a set of cells including a first subset of cells that each have at least one capability of one or more capabilities and a second subset of cells different than the first subset of cells, each cell within the second subset of cells lacking each capability of the one or more capabilities. The priority component 730 may be configured as or otherwise support a means for assigning a respective cell selection priority for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The cell selection component 735 may be configured as or otherwise support a means for selecting a cell within the set of cells based on the respective cell selection priority for the cell. In some examples, the camping component 725 may be configured as or otherwise support a means for attempting to camp on the selected cell within the set of cells.

In some examples, each cell within the first subset of cells and each cell within the second subset of cells is associated with a first RAT, and the priority component 730 may be configured as or otherwise support a means for assigning respective cell selection priorities to each cell within a third subset of cells included in the set of cells and different than the first subset of cells and the second subset of cells, where each cell within the third subset of cells has a lower respective cell selection priority than each cell within the second subset of cells based on each cell within the third subset of cells being associated with a second RAT different than the first RAT. In some examples, the cell selection component 735 may be configured as or otherwise support a means for assigning a higher respective cell selection priority to a current serving cell for the UE than for each cell within the first subset of cells. In some examples, assigning the respective cell selection priority for each cell within the set of cells includes storing an indication of the respective cell selection priority for each of the one or more cells within a data structure at the UE.

In some examples, the control signaling component 740 may be configured as or otherwise support a means for receiving control signaling indicating a respective configuration for each cell of the set of cells. In some examples, the cell capability component 745 may be configured as or otherwise support a means for determining that each cell within the first subset of cells has at least one capability of the one or more capabilities, that each cell within the second subset of cells lacks each capability of the one or more capabilities, or any combination thereof, based on the received control signaling indicating the respective configuration for each cell of the set of cells.

In some examples, the priority component 730 may be configured as or otherwise support a means for assigning respective cell selection priorities to each cell within the first subset of cells based on a respective recency of the UE camping on one or more cells within the first subset of cells. In some examples, the priority component 730 may be configured as or otherwise support a means for assigning respective cell selection priorities to each cell within the first subset of cells based on a respective carrier aggregation capability, a respective dual connectivity capability, a respective bandwidth capability, a respective MIMO layer capability, a respective RSRP, a respective cell type, or any combination thereof. In some examples, the priority component 730 may be configured as or otherwise support a means for assigning, respective cell selection priorities to each cell within the first subset of cells based on a respective power level for each cell within the first subset of cells. In some examples, the one or more capabilities include a dual connectivity capability, a carrier aggregation capability, or any combination thereof.

In some examples, the cell searching component 750 may be configured as or otherwise support a means for performing cell searching based on the respective cell selection priority of each cell within the set of cells, where the cell searching includes searching for each cell within the first subset of cells more frequently than each cell within the second subset of cells. In some examples, selecting the cell within the set of cells is further based on performing the cell searching. In some examples, the control signaling component 740 may be configured as or otherwise support a means for receiving, from a network entity, control signaling indicating the respective cell selection priority for each of one or more cells of the set of cells, the respective cell selection priority for each of the one or more cells based on each of the one or more cells having at least one capability of the one or more capabilities. In some examples, the priority component 730 may be configured as or otherwise support a means for assigning respective cell selection priorities to each cell within the first subset of cells based on the respective cell selection priority indicated by the control signaling for each of the one or more cells. In some examples, the control signaling includes system information that indicates the respective cell selection priority for each of the one or more cells.

Figure 8:
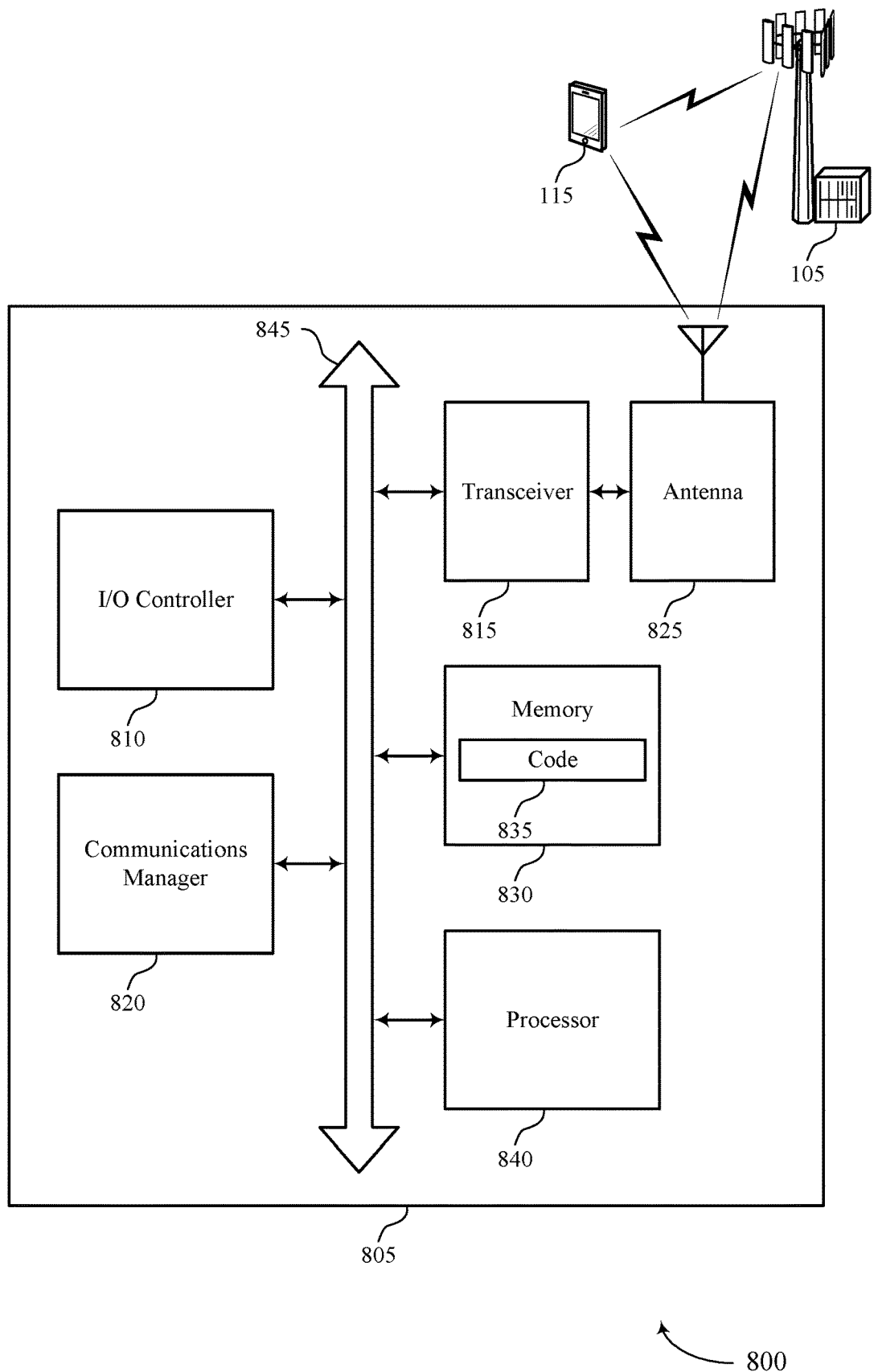
FIG. 8 shows a diagram of a system including a device that supports capability-based cell prioritization for cell selection and reselection in accordance with aspects of the present disclosure.

FIG. 8 shows a diagram of a system 800 including a device 805 that supports capability-based cell prioritization for cell selection and reselection in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting capability-based cell prioritization for cell selection and reselection). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for identifying a set of cells including a first subset of cells that each have at least one capability of one or more capabilities and a second subset of cells different than the first subset of cells, each cell within the second subset of cells lacking each capability of the one or more capabilities. The communications manager 820 may be configured as or otherwise support a means for assigning a respective cell selection priority for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The communications manager 820 may be configured as or otherwise support a means for selecting a cell within the set of cells based on the respective cell selection priority for the cell. The communications manager 820 may be configured as or otherwise support a means for attempting to camp on the selected cell within the set of cells.

By including or configuring the communications manager 820 in accordance with examples as described herein, the device 805 may support techniques for cell prioritization in cell selection and reselection. For example, the device 805 may prioritize selection of a cell based on the cell having a dual connectivity capability or a carrier aggregation capability, thereby enabling the device 805 to camp on a cell with increased throughput. Additionally, increased throughput at the device 805 may in turn enhance efficiency and reliability of the network, as the device 805 may communicate with other devices using an improved data rate and capacity.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of capability-based cell prioritization for cell selection and reselection as described herein, or the processor 840 and the memory 830 may be otherwise configured to perform or support such operations.

Figure 9:
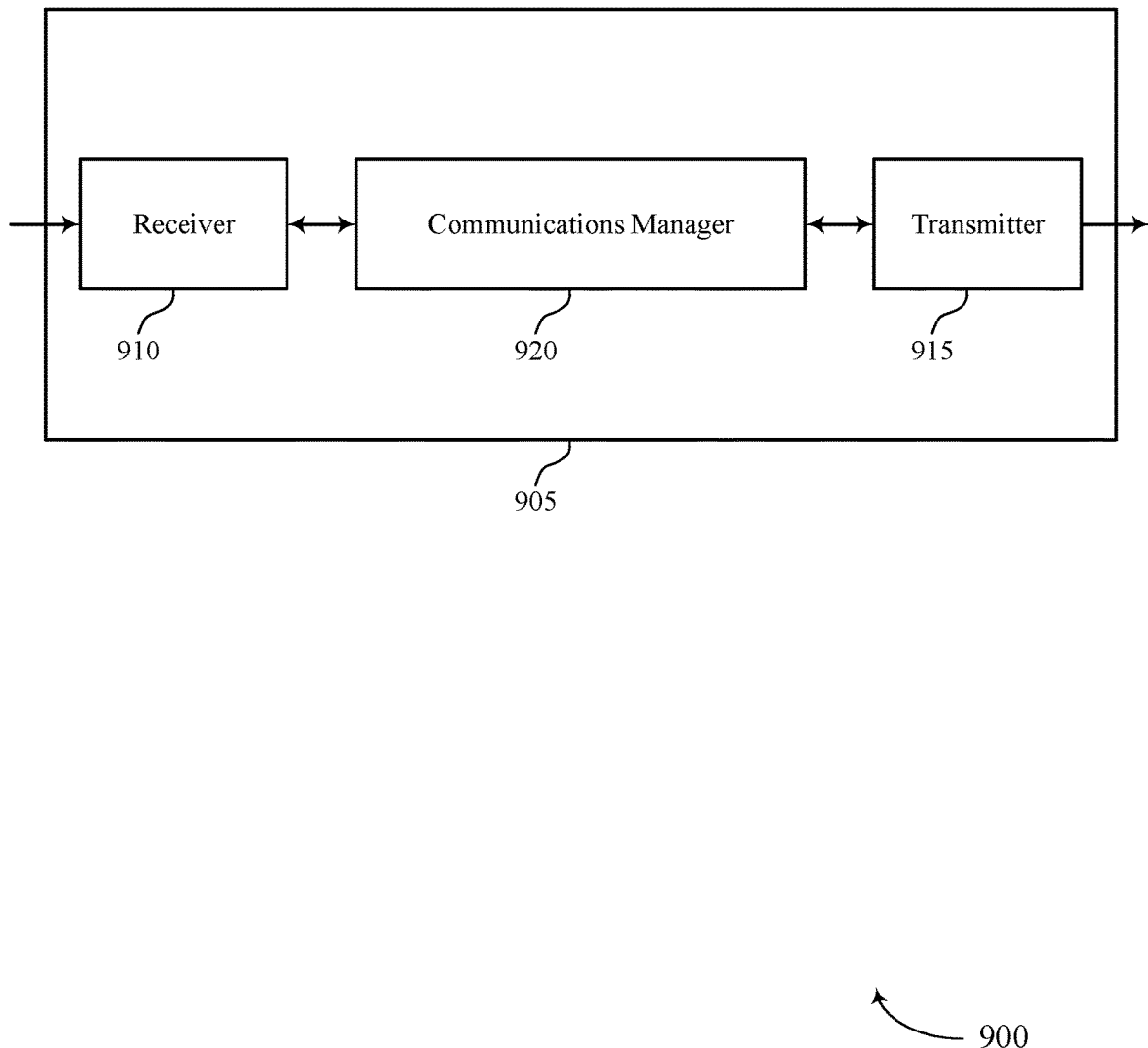
FIGS. 9 and 10 show block diagrams of devices that support capability-based cell prioritization for cell selection and reselection in accordance with aspects of the present disclosure.

FIG. 9 shows a block diagram 900 of a device 905 that supports capability-based cell prioritization for cell selection and reselection in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to capability-based cell prioritization for cell selection and reselection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to capability-based cell prioritization for cell selection and reselection). In some examples, the transmitter 915 may be co-located with a receiver 910 in a transceiver. The transmitter 915 may utilize a single antenna or a set of multiple antennas.

The communications manager 920, the receiver 910, the transmitter 915, or various combinations thereof or various components thereof may be examples of means for performing various aspects of capability-based cell prioritization for cell selection and reselection as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at the device 905 (e.g., a base station) in accordance with examples as disclosed herein. For example, the communications manager 920 may be configured as or otherwise support a means for identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities. The communications manager 920 may be configured as or otherwise support a means for transmitting, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for cell prioritization in cell selection and reselection. The device 905 may assign priority to cells that support capabilities that may improve performance in communications with other devices. Additionally, the device 905 may indicate the assigned priorities to a UE, thereby enabling the UE to select cells that provide increased throughput; the device 905 may therefore communicate with the UE with increased efficiency and reliability.

Figure 10:
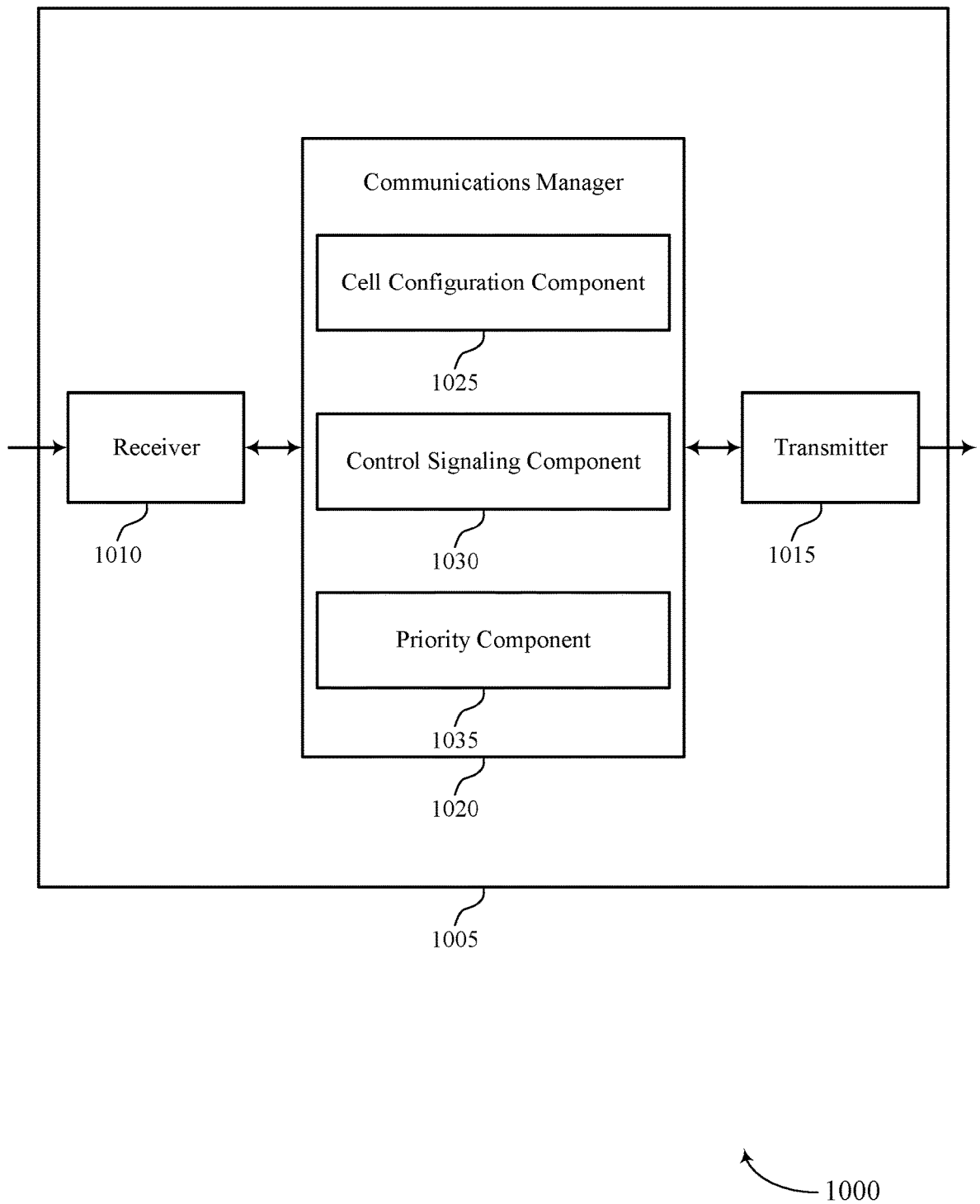

FIG. 10 shows a block diagram 1000 of a device 1005 that supports capability-based cell prioritization for cell selection and reselection in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to capability-based cell prioritization for cell selection and reselection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to capability-based cell prioritization for cell selection and reselection). In some examples, the transmitter 1015 may be co-located with a receiver 1010 in a transceiver. The transmitter 1015 may utilize a single antenna or a set of multiple antennas.

The device 1005, or various components thereof, may be an example of means for performing various aspects of capability-based cell prioritization for cell selection and reselection as described herein. For example, the communications manager 1020 may include a cell configuration component 1025, a control signaling component 1030, a priority component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at the device 1005 (e.g., a base station) in accordance with examples as disclosed herein. The cell configuration component 1025 may be configured as or otherwise support a means for identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities. The control signaling component 1030 may be configured as or otherwise support a means for transmitting, to a UE, control signaling indicating respective cell selection priorities for each cell within the set of cells. In some examples, each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities.

Figure 11:
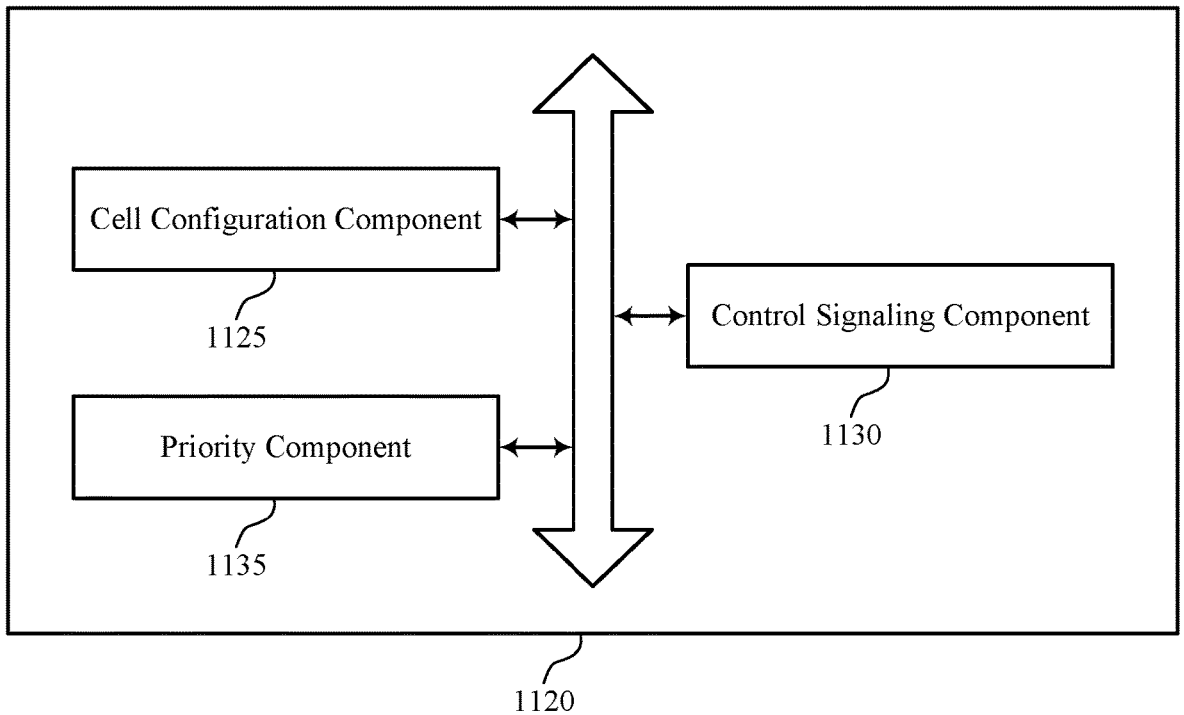
FIG. 11 shows a block diagram of a communications manager that supports capability-based cell prioritization for cell selection and reselection in accordance with aspects of the present disclosure.

FIG. 11 shows a block diagram 1100 of a communications manager 1120 that supports capability-based cell prioritization for cell selection and reselection in accordance with aspects of the present disclosure. The communications manager 1120 may be an example of aspects of a communications manager 920, a communications manager 1020, or both, as described herein. The communications manager 1120, or various components thereof, may be an example of means for performing various aspects of capability-based cell prioritization for cell selection and reselection as described herein. For example, the communications manager 1120 may include a cell configuration component 1125, a control signaling component 1130, a priority component 1135, or any combination thereof. Each of these components may communicate, directly or indirectly, with one another (e.g., via one or more buses).

The communications manager 1120 may support wireless communications at a base station in accordance with examples as disclosed herein. The cell configuration component 1125 may be configured as or otherwise support a means for identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities. The control signaling component 1130 may be configured as or otherwise support a means for transmitting, to a UE, control signaling indicating respective cell selection priorities for each cell within the set of cells. In some examples, each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities.

To support transmitting the control signaling indicating respective cell selection priorities for each cell within the set of cells, the control signaling component 1130 may be configured as or otherwise support a means for transmitting, within the control signaling, an indication of whether each cell within the set of cells has at least one capability of the one or more capabilities. In some examples, each cell within the first subset of cells and each cell within the second subset of cells is associated with a first RAT. In some examples, each cell within a third subset of cells included in the set of cells and different than the first subset of cells and the second subset of cells has a lower respective cell selection priority than each cell within the second subset of cells based on each cell within the third subset of cells being associated with a second RAT different than the first RAT. In some examples, the one or more capabilities include a dual connectivity capability, a carrier aggregation capability, or any combination thereof. In some examples, the control signaling includes system information that indicates the respective cell selection priorities for each cell within the set of cells.

Figure 12:
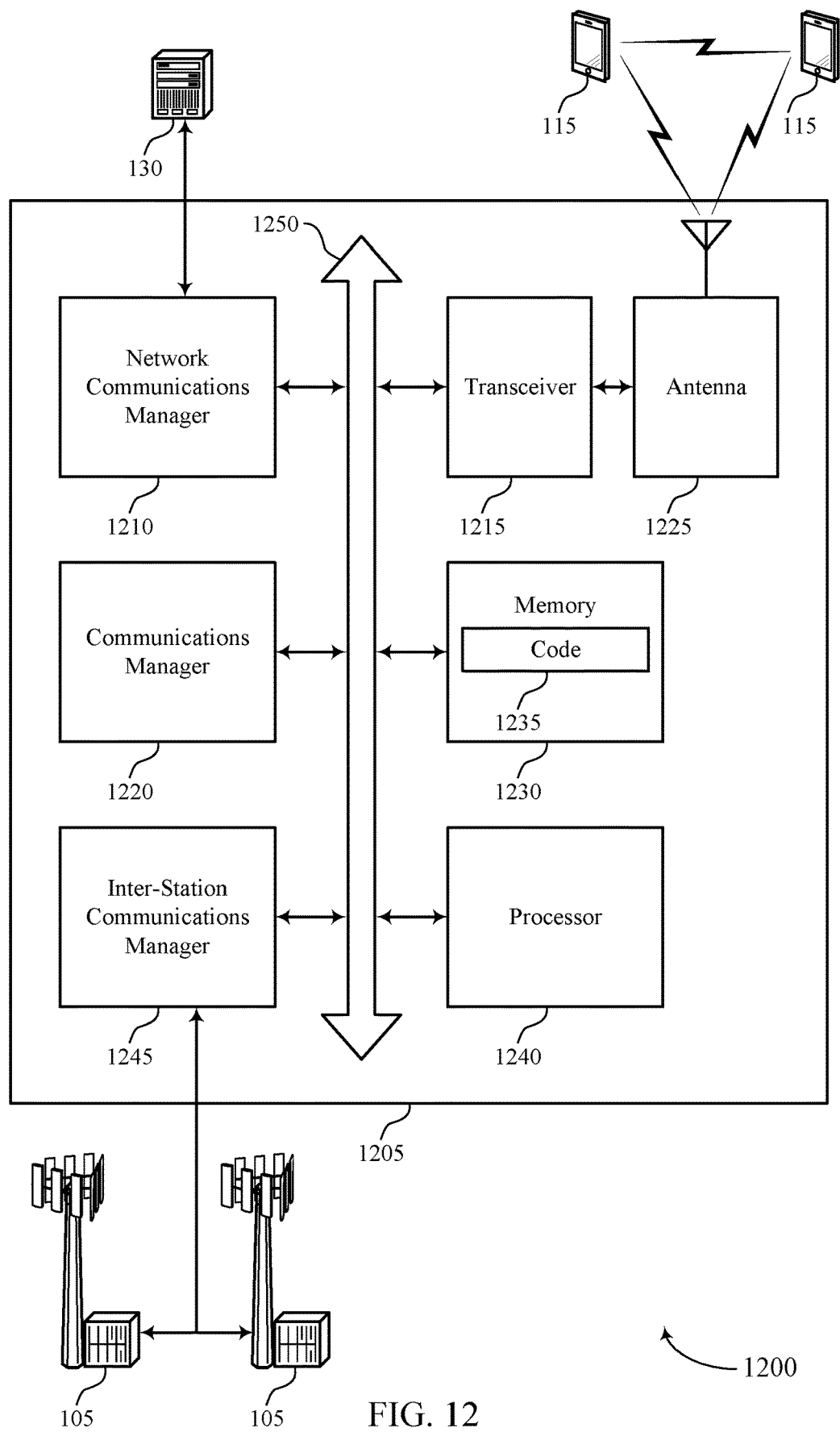
FIG. 12 shows a diagram of a system including a device that supports capability-based cell prioritization for cell selection and reselection in accordance with aspects of the present disclosure.

FIG. 12 shows a diagram of a system 1200 including a device 1205 that supports capability-based cell prioritization for cell selection and reselection in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting capability-based cell prioritization for cell selection and reselection). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at the device 1205 (e.g., a base station) in accordance with examples as disclosed herein. For example, the communications manager 1220 may be configured as or otherwise support a means for identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities. The communications manager 1220 may be configured as or otherwise support a means for transmitting, to a UE, control signaling indicating respective cell selection priorities for each cell within the set of cells. In some examples, each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities.

By including or configuring the communications manager 1220 in accordance with examples as described herein, the device 1205 may support techniques for cell prioritization in cell selection and reselection. For example, by assigning priority to cells that support capabilities associated with increased throughput, the device 1205 may communicate with other devices more quickly and efficiently. Additionally, increased throughput at the device 1205 may in turn enhance efficiency and reliability of the network, as the device 1205 may communicate with other devices using an improved data rate and capacity.

In some examples, the communications manager 1220 may be configured to perform various operations (e.g., receiving, monitoring, transmitting) using or otherwise in cooperation with the transceiver 1215, the one or more antennas 1225, or any combination thereof. For example, the communications manager 1220 may be configured to receive or transmit messages or other signaling as described herein via the transceiver 1215. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of capability-based cell prioritization for cell selection and reselection as described herein, or the processor 1240 and the memory 1230 may be otherwise configured to perform or support such operations.

Figure 13:
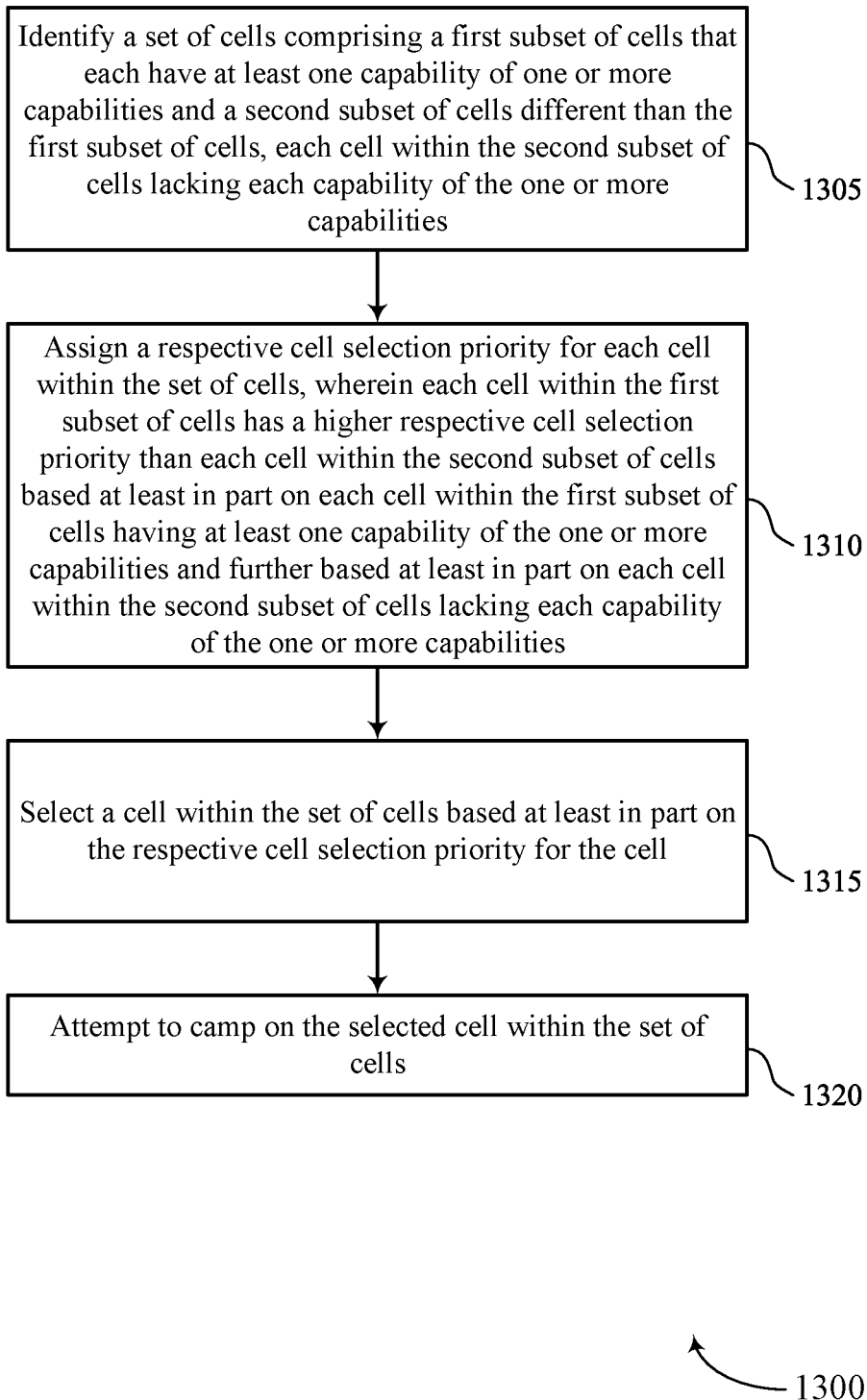
FIGS. 13 through 15 show flowcharts illustrating methods that support capability-based cell prioritization for cell selection and reselection in accordance with aspects of the present disclosure.

FIG. 13 shows a flowchart illustrating a method 1300 that supports capability-based cell prioritization for cell selection and reselection in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1305, the method may include identifying a set of cells including a first subset of cells that each have at least one capability of one or more capabilities and a second subset of cells different than the first subset of cells, each cell within the second subset of cells lacking each capability of the one or more capabilities. The operations of 1305 may be performed in accordance with examples as disclosed herein. In some examples, aspects of the operations of 1305 may be performed by a camping component 725 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1310, the method may include assigning a respective cell selection priority for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The operations of 1310 may be performed in accordance with examples as disclosed herein. In some examples, aspects of the operations of 1310 may be performed by a priority component 730 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1315, the method may include selecting a cell within the set of cells based on the respective cell selection priority for the cell. The operations of 1315 may be performed in accordance with examples as disclosed herein. In some examples, aspects of the operations of 1315 may be performed by a cell selection component 735 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1320, the method may include attempting to camp on the selected cell within the set of cells. The operations of 1320 may be performed in accordance with examples as disclosed herein. In some examples, aspects of the operations of 1320 may be performed by a camping component 725 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

Figure 14:
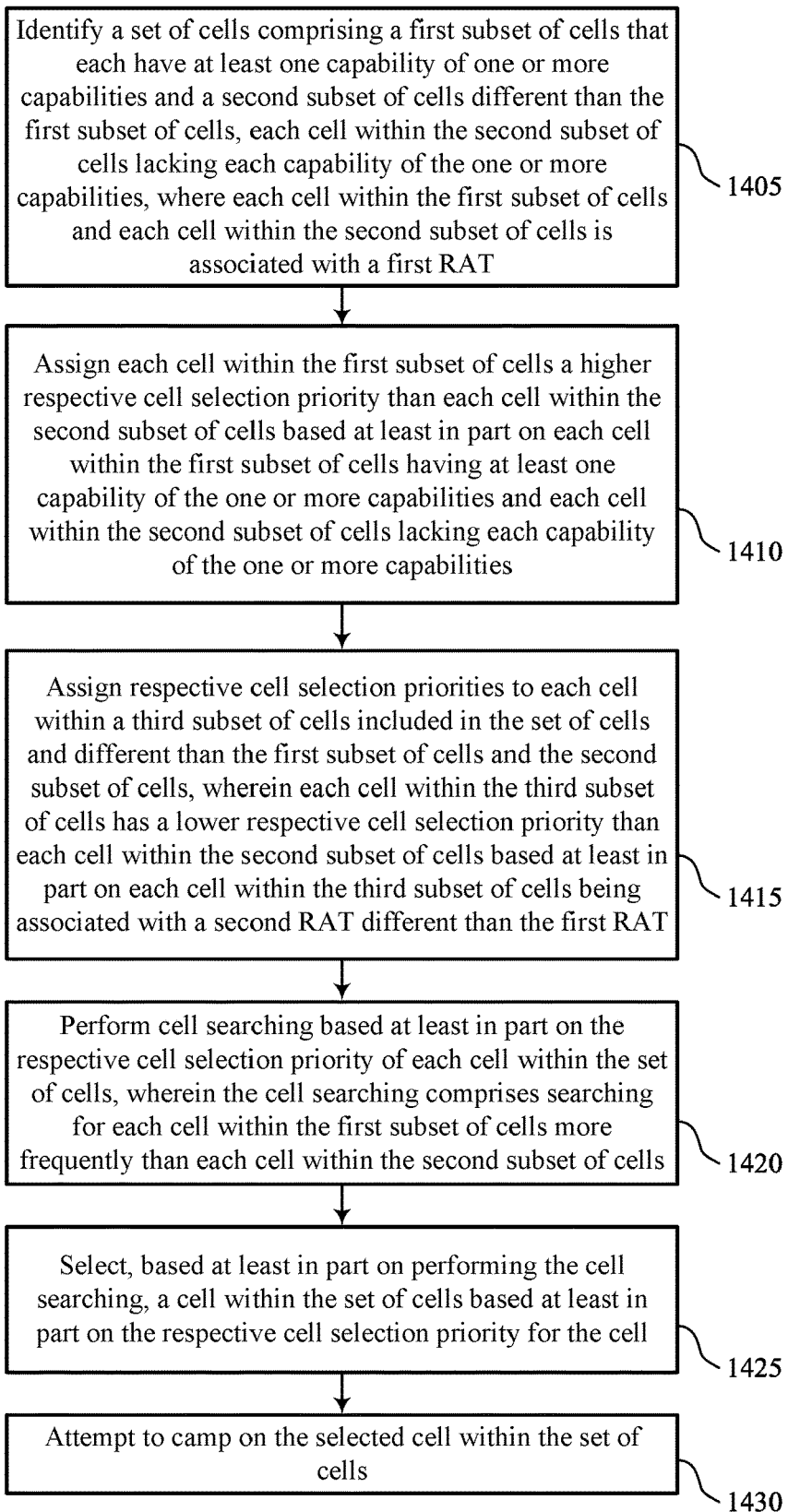

FIG. 14 shows a flowchart illustrating a method 1400 that supports capability-based cell prioritization for cell selection and reselection in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1405, the method may include identifying a set of cells including a first subset of cells that each have at least one capability of one or more capabilities and a second subset of cells different than the first subset of cells, each cell within the second subset of cells lacking each capability of the one or more capabilities, where each cell within the first subset of cells and each cell within the second subset of cells is associated with a first RAT. The operations of 1405 may be performed in accordance with examples as disclosed herein. In some examples, aspects of the operations of 1405 may be performed by a camping component 725 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1410, the method may include assigning each cell within the first subset of cells a higher respective cell selection priority than each cell within the second subset of cells based on each cell within the first subset of cells having at least one capability of the one or more capabilities and based on each cell within the second subset of cells lacking each capability of the one or more capabilities. The operations of 1410 may be performed in accordance with examples as disclosed herein. In some examples, aspects of the operations of 1410 may be performed by a priority component 730 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1415, the method may include assigning respective cell selection priorities to each cell within a third subset of cells included in the set of cells and different than the first subset of cells and the second subset of cells, where each cell within the third subset of cells has a lower respective cell selection priority than each cell within the second subset of cells based on each cell within the third subset of cells being associated with a second RAT different than the first RAT. The operations of 1415 may be performed in accordance with examples as disclosed herein. In some examples, aspects of the operations of 1415 may be performed by a priority component 730 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1420, the method may include performing cell searching based on the respective cell selection priority of each cell within the set of cells, where the cell searching includes searching for each cell within the first subset of cells more frequently than each cell within the second subset of cells. The operations of 1420 may be performed in accordance with examples as disclosed herein. In some examples, aspects of the operations of 1420 may be performed by a cell searching component 750 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1425, the method may include selecting, based on performing the cell searching, a cell within the set of cells based on the respective cell selection priority for the cell. The operations of 1425 may be performed in accordance with examples as disclosed herein. In some examples, aspects of the operations of 1425 may be performed by a cell selection component 735 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

At 1430, the method may include attempting to camp on the selected cell within the set of cells. The operations of 1430 may be performed in accordance with examples as disclosed herein. In some examples, aspects of the operations of 1430 may be performed by a camping component 725 as described with reference to FIG. 7. Additionally or alternatively, means for performing 1305 may, but not necessarily, include, for example, the I/O controller 810, the antenna 825, the transceiver 815, the communications manager 820, the memory 830 (including the code 835), and/or the processor 840.

Figure 15:
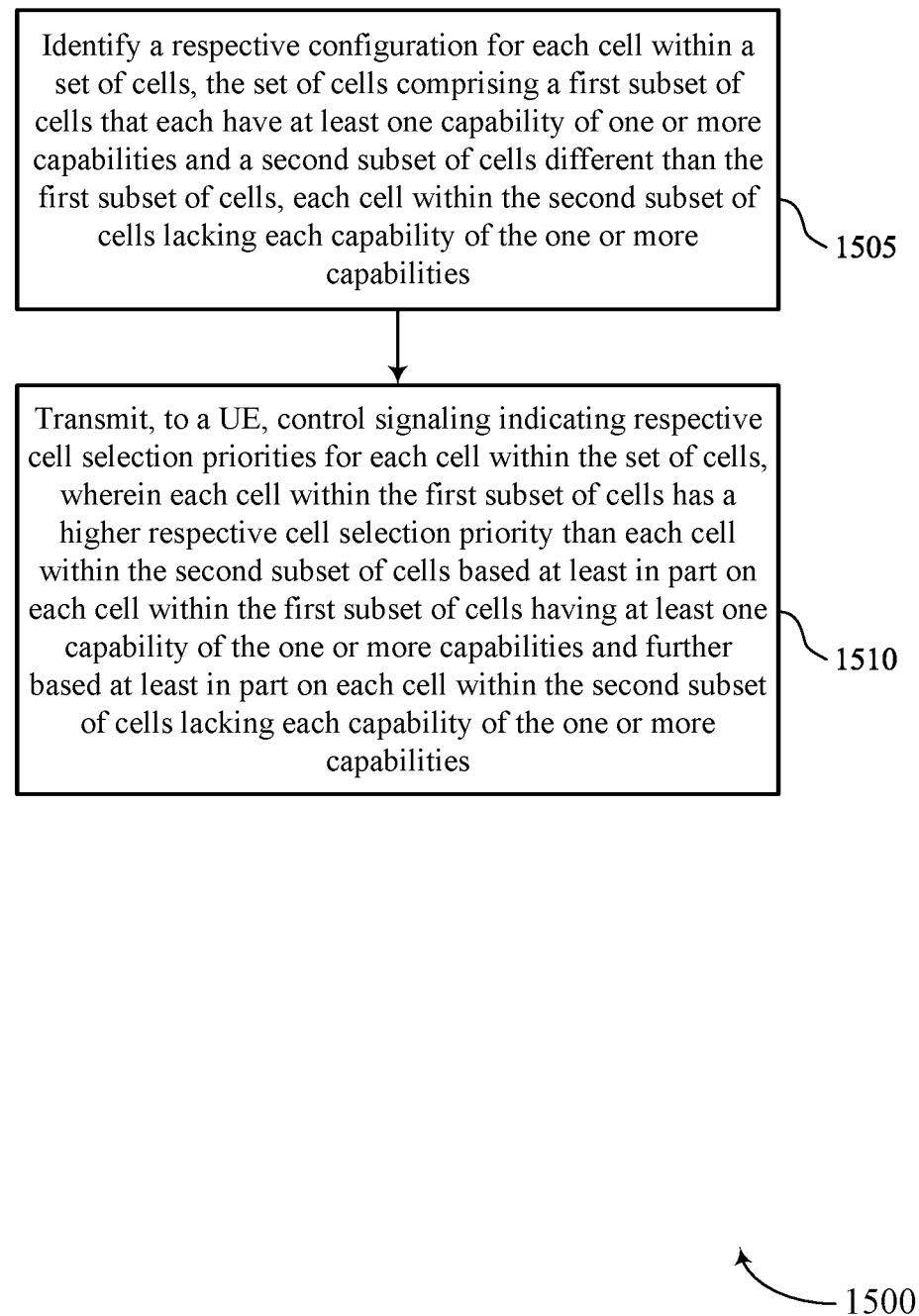

FIG. 15 shows a flowchart illustrating a method 1500 that supports capability-based cell prioritization for cell selection and reselection in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, a base station may perform aspects of the described functions using special-purpose hardware.

At 1505, the method may include identifying a respective configuration for each cell within a set of cells, the set of cells including a first subset of cells that each have at least one capability of one or more capabilities and a second subset of cells different than the first subset of cells, each cell within the second subset of cells lacking each capability of the one or more capabilities. The operations of 1505 may be performed in accordance with examples as disclosed herein. In some examples, aspects of the operations of 1505 may be performed by a cell configuration component 1125 as described with reference to FIG. 11. Additionally or alternatively, means for performing 1505 may, but not necessarily, include, for example, the communications manager 1220, the memory 1230 (including the code 1235), and/or the processor 1240.

At 1510, the method may include transmitting, to a UE, control signaling indicating respective cell selection priorities for each cell within the set of cells, where each cell within the first subset of cells has a higher respective cell selection priority than each cell within the second subset of cells based on each cell within the first subset of cells having at least one capability of the one or more capabilities and based on each cell within the second subset of cells lacking each capability of the one or more capabilities. The operations of 1510 may be performed in accordance with examples as disclosed herein. In some examples, aspects of the operations of 1510 may be performed by a control signaling component 1130 as described with reference to FIG. 11. Additionally or alternatively, means for performing 1505 may, but not necessarily, include, for example, the communications manager 1220, the memory 1230 (including the code 1235), and/or the processor 1240.

The following provides an overview of aspects of the present disclosure:

Aspect 1: A method of wireless communication at a UE, comprising: identifying a set of cells comprising a first subset of cells that each have at least one capability of one or more capabilities and a second subset of cells different than the first subset of cells, each cell within the second subset of cells lacking each capability of the one or more capabilities; assigning a respective cell selection priority for each cell within the set of cells, where each cell within the first subset of cells has a higher respective cell selection priority than each cell within the second subset of cells based at least in part on each cell within the first subset of cells having at least one capability of the one or more capabilities and further based on each cell within the second subset of cells lacking each capability of the one or more capabilities; selecting a cell within the set of cells based at least in part on the respective cell selection priority for the cell; and attempting to camp on the selected cell within the set of cells.

Aspect 2: The method of aspect 1, wherein each cell within the first subset of cells and each cell within the second subset of cells is associated with a first RAT, the method further comprising: assigning respective cell selection priorities to each cell within a third subset of cells included in the set of cells and different than the first subset of cells and the second subset of cells, wherein each cell within the third subset of cells has a lower respective cell selection priority than each cell within the second subset of cells based at least in part on each cell within the third subset of cells being associated with a second RAT different than the first RAT.

Aspect 3: The method of any of aspects 1 through 2, further comprising: assigning a higher respective cell selection priority to a current serving cell for the UE than for each cell within the first subset of cells.

Aspect 4: The method of any of aspects 1 through 3, further comprising: receiving control signaling indicating a respective configuration for each cell of the set of cells; and determining that each cell within the first subset of cells has at least one capability of the one or more capabilities, that each cell within the second subset of cells lacks each capability of the one or more capabilities, or any combination thereof, based at least in part on the received control signaling indicating the respective configuration for each cell of the set of cells.

Aspect 5: The method of any of aspects 1 through 4, further comprising: assigning respective cell selection priorities to each cell within the first subset of cells based at least in part on a respective recency of the UE camping on one or more cells within the first subset of cells.

Aspect 6: The method of any of aspects 1 through 5, further comprising: assigning respective cell selection priorities to each cell within the first subset of cells based at least in part on a respective carrier aggregation capability, a respective dual connectivity capability, a respective bandwidth capability, a respective multiple-input multiple-output layer capability, a respective reference signal received power, a respective cell type, a respective power level, or any combination thereof.

Aspect 7: The method of any of aspects 1 through Error! Reference source not found., wherein the one or more capabilities comprise a dual connectivity capability, a carrier aggregation capability, or any combination thereof.

Aspect 8: The method of any of aspects 1 through 7, further comprising: performing cell searching based at least in part on the respective cell selection priority of each cell within the set of cells, wherein the cell searching comprises searching for each cell within the first subset of cells more frequently than each cell within the second subset of cells, wherein selecting the cell within the set of cells is further based at least in part on performing the cell searching.

Aspect 9: The method of any of aspects 1 through 8, further comprising: receiving, from a network entity, control signaling indicating the respective cell selection priority for each of one or more cells of the set of cells, the respective cell selection priority for each of the one or more cells based at least in part on each of the one or more cells having at least one capability of the one or more capabilities; and assigning respective cell selection priorities to each cell within the first subset of cells based at least in part on the respective cell selection priority indicated by the control signaling for each of the one or more cells.

Aspect 10: The method of aspect 9, wherein the control signaling comprises system information that indicates the respective cell selection priority for each of the one or more cells.

Aspect 11: The method of aspect 9, wherein assigning the respective cell selection priority for each cell within the set of cells comprises storing an indication of the respective cell selection priority for each of the one or more cells within a data structure at the UE.

Aspect 12: A method of wireless communication at a base station, comprising: identifying a respective configuration for each cell within a set of cells, the set of cells comprising a first subset of cells that each have at least one capability of one or more capabilities and a second subset of cells different than the first subset of cells, each cell within the second subset of cells lacking each capability of the one or more capabilities; and transmitting, to a UE, control signaling indicating respective cell selection priorities for each cell within the set of cells, wherein each cell within the first subset of cells has a higher respective cell selection priority than each cell within the second subset of cells based at least in part on each cell within the first subset of cells having at least one capability of the one or more capabilities and further based on each cell within the second subset of cells lacking each capability of the one or more capabilities.

Aspect 13: The method of aspect 12, wherein transmitting the control signaling indicating respective cell selection priorities for each cell within the set of cells comprises: transmitting, within the control signaling, an indication of whether each cell within the set of cells has at least one capability of the one or more capabilities.

Aspect 14: The method of any of aspects 12 through 13, wherein each cell within the first subset of cells and each cell within the second subset of cells is associated with a first RAT.

Aspect 15: The method of aspect 14, wherein each cell within a third subset of cells included in the set of cells and different than the first subset of cells and the second subset of cells has a lower respective cell selection priority than each cell within the second subset of cells based at least in part on each cell within the third subset of cells being associated with a second RAT different than the first RAT.

Aspect 16: The method of any of aspects 12 through 15, wherein the one or more capabilities comprise a dual connectivity capability, a carrier aggregation capability, or any combination thereof.

Aspect 17: The method of any of aspects 12 through 16, wherein the control signaling comprises system information that indicates the respective cell selection priorities for each cell within the set of cells.

Aspect 18: An apparatus comprising memory; a transceiver; and at least one processor of a UE, the at least one processor coupled with the memory and the transceiver, and the at least one processor configured to cause the apparatus to perform a method of any of aspects 1 through 10.

Aspect 19: An apparatus comprising at least one means for performing a method of any of aspects 1 through 10.

Aspect 20: A non-transitory computer-readable medium storing code the code comprising instructions executable by a processor to perform a method of any of aspects 1 through 10.

Aspect 21: An apparatus comprising memory; a transceiver; and at least one processor of a base station, the at least one processor coupled with the memory and the transceiver, and the at least one processor configured to cause the apparatus to perform a method of any of aspects 12 through 17.

Aspect 22: An apparatus comprising at least one means for performing a method of any of aspects 12 through 17.

Aspect 23: A non-transitory computer-readable medium storing code the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a user equipment (UE), comprising:
    identifying a set of cells comprising a first subset of cells that each have at least one capability of one or more capabilities and a second subset of cells different than the first subset of cells, each cell within the second subset of cells lacking each capability of the one or more capabilities, wherein the one or more capabilities comprise a dual connectivity capability, a carrier aggregation capability, or any combination thereof;
    assigning a respective cell selection priority for each cell within the set of cells, wherein:
        each cell within the first subset of cells has a higher respective cell selection priority than each cell within the second subset of cells based at least in part on each cell within the first subset of cells having at least one capability of the one or more capabilities and further based at least in part on each cell within the second subset of cells lacking each capability of the one or more capabilities, and
        the respective cell selection priority for each cell within the first subset of cells is assigned based at least in part on one or more cell parameters, the one or more cell parameters including:
        a respective recency of the UE camping on one or more cells within the first subset of cells, a respective bandwidth capability, a respective multiple-input multiple-output layer capability, a respective reference signal received power, a respective cell type, a respective power level, or any combination thereof;
    performing cell searching based at least in part on the respective cell selection priority of each cell within the set of cells, wherein the cell searching comprises searching for each cell within the first subset of cells more frequently than each cell within the second subset of cells;
    selecting a cell within the set of cells based at least in part on the respective cell selection priority for the cell and the cell searching; and
    attempting to camp on the selected cell within the set of cells.

2. The method of claim 1, wherein each cell within the first subset of cells and each cell within the second subset of cells is associated with a first radio access technology, the method further comprising:
    assigning respective cell selection priorities to each cell within a third subset of cells included in the set of cells and different than the first subset of cells and the second subset of cells, wherein each cell within the third subset of cells has a lower respective cell selection priority than each cell within the second subset of cells based at least in part on each cell within the third subset of cells being associated with a second radio access technology different than the first radio access technology.

3. The method of claim 1, further comprising:
    assigning a higher respective cell selection priority to a current serving cell for the UE than for each cell within the first subset of cells.

4. The method of claim 1, further comprising:
    receiving control signaling indicating a respective configuration for each cell of the set of cells; and determining that each cell within the first subset of cells has at least one capability of the one or more capabilities, that each cell within the second subset of cells lacks each capability of the one or more capabilities, or any combination thereof, based at least in part on the received control signaling indicating the respective configuration for each cell of the set of cells.

5. The method of claim 1, further comprising:
receiving, from a network entity, control signaling comprising the respective cell selection priority for each of one or more cells of the set of cells, the respective cell selection priority for each of the one or more cells based at least in part on each of the one or more cells having at least one capability of the one or more capabilities; and
assigning respective cell selection priorities to each cell within the first subset of cells based at least in part on the respective cell selection priority indicated by the control signaling for each of the one or more cells.

6. The method of claim 5, wherein the control signaling comprises system information that indicates the respective cell selection priority for each of the one or more cells.

7. The method of claim 5, wherein assigning the respective cell selection priority for each cell within the set of cells comprises:
storing an indication of the respective cell selection priority for each of the one or more cells within a data structure at the UE.

8. A method of wireless communication at a network entity, comprising:
identifying a respective configuration for each cell within a set of cells, the set of cells comprising a first subset of cells that each have at least one capability of one or more capabilities and a second subset of cells different than the first subset of cells, each cell within the second subset of cells lacking each capability of the one or more capabilities; and
transmitting, to a user equipment (UE), control signaling comprising respective cell selection priorities for each cell within the set of cells, wherein each cell within the first subset of cells has a higher respective cell selection priority than each cell within the second subset of cells based at least in part on each cell within the first subset of cells having at least one capability of the one or more capabilities and further based at least in part on each cell within the second subset of cells lacking each capability of the one or more capabilities, wherein:
each cell within the first subset of cells is assigned a respective cell selection priority based at least in part on one or more cell parameters, the one or more cell parameters including:
a respective recency of the UE camping on one or more cells within the first subset of cells, a respective bandwidth capability, a respective multiple-input multiple-output layer capability, a respective reference signal received power, a respective cell type, a respective power level, or any combination thereof, and
each cell within the first subset of cells is associated with a higher frequency of cell searching than each cell within the second subset of cells based at least in part on the respective cell selection priorities for each cell within the set of cells.

9. The method of claim 8, wherein transmitting the control signaling indicating respective cell selection priorities for each cell within the set of cells comprises:
transmitting, within the control signaling, an indication of whether each cell within the set of cells has at least one capability of the one or more capabilities.

10. The method of claim 8, wherein each cell within the first subset of cells and each cell within the second subset of cells is associated with a first radio access technology.

11. The method of claim 10, wherein each cell within a third subset of cells included in the set of cells and different than the first subset of cells and the second subset of cells has a lower respective cell selection priority than each cell within the second subset of cells based at least in part on each cell within the third subset of cells being associated with a second radio access technology different than the first radio access technology.

12. The method of claim 8, wherein the one or more capabilities comprise a dual connectivity capability, a carrier aggregation capability, or any combination thereof.

13. The method of claim 8, wherein the control signaling comprises system information that indicates the respective cell selection priorities for each cell within the set of cells.

14. An apparatus for wireless communication comprising:
memory;
a transceiver; and
at least one processor of a user equipment (UE), the at least one processor coupled with the memory and the transceiver, and the at least one processor configured to cause the apparatus to:
identify a set of cells comprising a first subset of cells that each have at least one capability of one or more capabilities and a second subset of cells different than the first subset of cells, each cell within the second subset of cells lacking each capability of the one or more capabilities, wherein the one or more capabilities comprise a dual connectivity capability, a carrier aggregation capability, or any combination thereof;
assign a respective cell selection priority for each cell within the set of cells, wherein;
each cell within the first subset of cells has a higher respective cell selection priority than each cell within the second subset of cells based at least in part on each cell within the first subset of cells having at least one capability of the one or more capabilities and further based at least in part on each cell within the second subset of cells lacking each capability of the one or more capabilities, and
the respective cell selection priority for each cell within the first subset of cells is assigned based at least in part on one or more cell parameters the one or more cell parameters including:
a respective recency of the UE camping on one or more cells within the first subset of cells, a respective bandwidth capability, a respective multiple-input multiple-output layer capability, a respective reference signal received power, a respective cell type, a respective power level, or any combination thereof; and
perform cell searching based at least in part on the respective cell selection priority of each cell within the set of cells, wherein the cell searching comprises searching for each cell within the first subset of cells more frequently than each cell within the second subset of cells;
select a cell within the set of cells based at least in part on the respective cell selection priority for the cell and the cell searching; and attempt to camp on the selected cell within the set of cells.

15. The apparatus of claim 14, wherein each cell within the first subset of cells and each cell within the second subset of cells is associated with a first radio access technology, the at least one processor further configured to cause the apparatus to:
assign respective cell selection priorities to each cell within a third subset of cells included in the set of cells and different than the first subset of cells and the second subset of cells, wherein each cell within the third subset of cells has a lower respective cell selection priority than each cell within the second subset of cells based at least in part on each cell within the third subset of cells being associated with a second radio access technology different than the first radio access technology.

16. The apparatus of claim 14, the at least one processor further configured to cause the apparatus to:
assign a higher respective cell selection priority to a current serving cell for the UE than for each cell within the first subset of cells.

17. The apparatus of claim 14, the at least one processor further configured to cause the apparatus to:
receive, via the transceiver, control signaling indicating a respective configuration for each cell of the set of cells; and
determine that each cell within the first subset of cells has at least one capability of the one or more capabilities, that each cell within the second subset of cells lacks each capability of the one or more capabilities, or any combination thereof, based at least in part on the received control signaling indicating the respective configuration for each cell of the set of cells.

18. The apparatus of claim 14, the at least one processor further configured to cause the apparatus to:
receive, from a network entity via the transceiver, control signaling comprising the respective cell selection priority for each of one or more cells of the set of cells, the respective cell selection priority for each of the one or more cells based at least in part on each of the one or more cells having at least one capability of the one or more capabilities; and
assign respective cell selection priorities to each cell within the first subset of cells based at least in part on the respective cell selection priority indicated by the control signaling for each of the one or more cells.

19. The apparatus of claim 18, wherein the control signaling comprises system information that indicates the respective cell selection priority for each of the one or more cells.

20. The apparatus of claim 18, the at least one processor further configured to cause the apparatus to:
store an indication of the respective cell selection priority for each of the one or more cells within a data structure at the UE.

21. An apparatus for wireless communications comprising:
memory; and
at least one processor of a network entity, the at least one processor coupled with the memory, and the at least one processor configured to cause the apparatus to:
identify a respective configuration for each cell within a set of cells, the set of cells comprising a first subset of cells that each have at least one capability of one or more capabilities and a second subset of cells different than the first subset of cells, each cell within the second subset of cells lacking each capability of the one or more capabilities; and
transmit, to a user equipment (UE), control signaling comprising respective cell selection priorities for each cell within the set of cells, wherein each cell within the first subset of cells has a higher respective cell selection priority than each cell within the second subset of cells based at least in part on each cell within the first subset of cells having at least one capability of the one or more capabilities and further based at least in part on each cell within the second subset of cells lacking each capability of the one or more capabilities, wherein:
each cell within the first subset of cells is assigned a respective cell selection priority based at least in part on one or more cell parameters, the one or more cell parameters including:
a respective recency of the UE camping on one or more cells within the first subset of cells, a respective bandwidth capability, a respective multiple-input multiple-output layer capability, a respective reference signal received power, a respective cell type, a respective power level, or any combination thereof, and
each cell within the first subset of cells is associated with a higher frequency of cell searching than each cell within the second subset of cells based at least in part on the respective cell selection priorities for each cell within the set of cells.

22. The apparatus of claim 21, the at least one processor further configured to cause the apparatus to:
transmit, within the control signaling, an indication of whether each cell within the set of cells has at least one capability of the one or more capabilities.

* * * * *